US012327406B1

(12) United States Patent
Jindal et al.

(10) Patent No.: US 12,327,406 B1
(45) Date of Patent: Jun. 10, 2025

(54) METHODS, SYSTEMS, APPARATUSES, AND DEVICES FOR PROVISIONING ASSISTANCE TO USERS IN PERFORMING ACTIVITIES

(71) Applicants: Sarthak Jindal, Acton, MA (US); Itisha Gupta, Gurgaon (IN)

(72) Inventors: Sarthak Jindal, Acton, MA (US); Itisha Gupta, Gurgaon (IN)

(*) Notice: Subject to any disclaimer, the term of this patent is extended or adjusted under 35 U.S.C. 154(b) by 0 days.

(21) Appl. No.: 19/001,558

(22) Filed: Dec. 26, 2024

(51) Int. Cl.
| | |
|---|---|
| *G06V 20/17* | (2022.01) |
| *B64U 20/87* | (2023.01) |
| *G06T 7/73* | (2017.01) |
| *G06V 10/82* | (2022.01) |
| *G06V 20/52* | (2022.01) |
| *H04N 7/18* | (2006.01) |

(52) U.S. Cl.
CPC ............. *G06V 20/17* (2022.01); *B64U 20/87* (2023.01); *G06T 7/74* (2017.01); *G06V 20/52* (2022.01); *H04N 7/185* (2013.01); *B64U 2201/10* (2023.01); *G06T 2207/10032* (2013.01); *G06T 2207/20081* (2013.01); *G06T 2207/30244* (2013.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2016/0363339 | A1* | 12/2016 | Blackley | A61L 9/14 |
| 2017/0195505 | A1* | 7/2017 | Wexler | G06V 10/764 |
| 2017/0195572 | A1* | 7/2017 | Wexler | G06V 20/20 |
| 2017/0259920 | A1* | 9/2017 | Lai | G05D 1/0011 |
| 2018/0019516 | A1* | 1/2018 | Teague | H04B 7/18504 |
| 2018/0036632 | A1* | 2/2018 | Poynter | A63F 9/24 |
| 2018/0248613 | A1* | 8/2018 | Peitzer | H04B 17/12 |
| 2018/0350054 | A1* | 12/2018 | Fox | B64D 27/24 |
| 2019/0077007 | A1* | 3/2019 | Mallinson | A61B 5/1128 |
| 2019/0314843 | A1* | 10/2019 | Nour-Omid | G05B 19/042 |
| 2019/0340940 | A1* | 11/2019 | Elkabetz | G08G 5/76 |
| 2020/0167722 | A1* | 5/2020 | Goldberg | G08G 5/26 |
| 2021/0035473 | A1* | 2/2021 | Al-Dilaimi | A01M 1/026 |
| 2021/0116912 | A1* | 4/2021 | Pikus | G05D 1/101 |
| 2021/0349478 | A1* | 11/2021 | Bigdeli | G05D 1/227 |
| 2021/0374783 | A1* | 12/2021 | Bronicki | G05D 1/249 |
| 2022/0386583 | A1* | 12/2022 | Tresch | G16B 20/00 |

(Continued)

*Primary Examiner* — Delomia L Gilliard
(74) *Attorney, Agent, or Firm* — Dhiraj Jindal; PATENT YOGI LLC

(57) ABSTRACT

An apparatus for provisioning assistance to users in performing activities. The apparatus includes a drone configured to be at least one of positioned and moved to at least one of a plurality of positions, an imaging sensor coupled to the drone, and configured for imaging an environment of the drone based on at least one of the positioning and the moving of the drone, a processing device coupled to the drone, and communicatively coupled with the imaging sensor, and a device coupled with the drone, and operatively coupled with the processing device. The processing device is configured for generating an imaging data based on the imaging, analyzing the imaging data using a machine learning model, generating an insight associated with an activity based on the analyzing, and determining an operation based on the insight. The device is configured for performing the operation.

17 Claims, 18 Drawing Sheets

(56) References Cited

U.S. PATENT DOCUMENTS

| | | | |
|---|---|---|---|
| 2023/0281549 A1* | 9/2023 | Bronicki | G06Q 30/0208 |
| | | | 705/14.11 |
| 2023/0412922 A1* | 12/2023 | Tsairi | H04N 23/665 |
| 2024/0241520 A1* | 7/2024 | Araujo | B64U 50/37 |
| 2025/0031889 A1* | 1/2025 | Bennet | H04W 12/08 |

* cited by examiner

METHODS, SYSTEMS, APPARATUSES, AND DEVICES FOR PROVISIONING ASSISTANCE TO USERS IN PERFORMING ACTIVITIES

FIELD OF THE INVENTION

Generally, the present disclosure relates to the field of data processing. More specifically, the present disclosure relates to methods, systems, apparatuses, and devices for provisioning assistance to users in performing activities.

BACKGROUND OF THE INVENTION

Existing apparatuses for provisioning assistance to users in performing activities are deficient with regard to several aspects. For instance, current apparatuses may monitor a specific area. As a result, different apparatuses are needed for performing assessments while monitoring the specific area and performing operations in accordance with the assessments to assist the user. Furthermore, current technologies may monitor an individual. As a result, different apparatuses are needed for performing assessments while monitoring the specific area and performing operations in accordance with the assessments to assist the user.

Therefore, there is a need for improved methods, systems, apparatuses, and devices for provisioning assistance to users in performing activities that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for provisioning assistance to users in performing activities, in accordance with some embodiments. Accordingly, the apparatus may include a drone, at least one imaging sensor, a processing device, and at least one device. Further, the drone may be configured to be at least one of positioned and moved to at least one of a plurality of positions. Further, the at least one imaging sensor may be coupled to the drone. Further, the at least one imaging sensor may be configured for imaging an environment of the drone based on at least one of the positioning and the moving of the drone to at least one of the plurality of positions. Further, the imaging of the environment assists at least one user in performing at least one activity. Further, the processing device may be coupled to the drone. Further, the processing device may be communicatively coupled with the at least one imaging sensor. Further, the processing device may be configured for generating at least one imaging data based on the imaging. Further, the processing device may be configured for analyzing the at least one imaging data using at least one machine learning model. Further, the processing device may be configured for generating at least one insight associated with the at least one activity based on the analyzing of the at least one imaging data. Further, the processing device may be configured for determining at least one operation based on the at least one insight. Further, the at least one device may be coupled with the drone. Further, the at least one device may be operatively coupled with the processing device. Further, the at least one device may be configured for performing the at least one operation.

Further disclosed herein is an apparatus for provisioning assistance to users in performing activities, in accordance with some embodiments. Accordingly, the apparatus may include a drone, at least one imaging sensor, a processing device, and at least one device. Further, the drone may be configured to be at least one of positioned and moved to at least one of a plurality of positions. Further, the at least one imaging sensor may be coupled to the drone. Further, the at least one imaging sensor may be configured for imaging an environment of the drone based on at least one of the positioning and the moving of the drone to at least one of the plurality of positions. Further, the imaging of the environment assists at least one user in performing at least one activity. Further, the processing device may be coupled to the drone. Further, the processing device may be communicatively coupled with the at least one imaging sensor. Further, the processing device may be configured for generating at least one imaging data based on the imaging. Further, the processing device may be configured for analyzing the at least one imaging data using at least one machine learning model. Further, the processing device may be configured for generating at least one insight associated with the at least one activity based on the analyzing of the at least one imaging data. Further, the processing device may be configured for determining at least one operation based on the at least one insight. Further, the at least one device may be coupled with the drone. Further, the at least one device may be operatively coupled with the processing device. Further, the at least one device may be configured for performing the at least one operation. Further, the at least one device may include at least one dispenser. Further, the at least one dispenser may be configured for dispensing at least one amount of at least one fluid supplied to the at least one dispenser. Further, the performing of the at least one operation may include the dispensing of the at least one amount of the at least one fluid.

Further disclosed herein is an apparatus for provisioning assistance to users in performing activities, in accordance with some embodiments. Accordingly, the apparatus may include a drone, at least one imaging sensor, a processing device, and at least one device. Further, the drone may be configured to be at least one of positioned and moved to at least one of a plurality of positions. Further, the at least one imaging sensor may be coupled to the drone. Further, the at least one imaging sensor may be configured for imaging an environment of the drone based on at least one of the positioning and the moving of the drone to at least one of the plurality of positions. Further, the imaging of the environment assists at least one user in performing at least one activity. Further, the processing device may be coupled to the drone. Further, the processing device may be communicatively coupled with the at least one imaging sensor. Further, the processing device may be configured for generating at least one imaging data based on the imaging. Further, the processing device may be configured for analyzing the at least one imaging data using at least one machine learning model. Further, the processing device may be configured for recognizing at least one organism present in at least one region based on the analyzing of the at least one imaging data. Further, the processing device may be configured for generating at least one organism data of the at least one organism based on the recognizing of the at least one organism and the analyzing of the at least one imaging data. Further, the processing device may be configured for analyzing the at least one organism data based on at least one additional data. Further, the processing device may be configured for generating at least one insight associated with the at least one activity based on the analyzing of the at least one imaging data and the analyzing of the at least one organism data. Further, the processing device may be configured for determining at least one operation based on the at least one insight. Further, the at least one device may be coupled with the drone. Further, the at least one device may be operatively coupled with the processing device. Further, the at least one device may be configured for performing the at least one operation.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
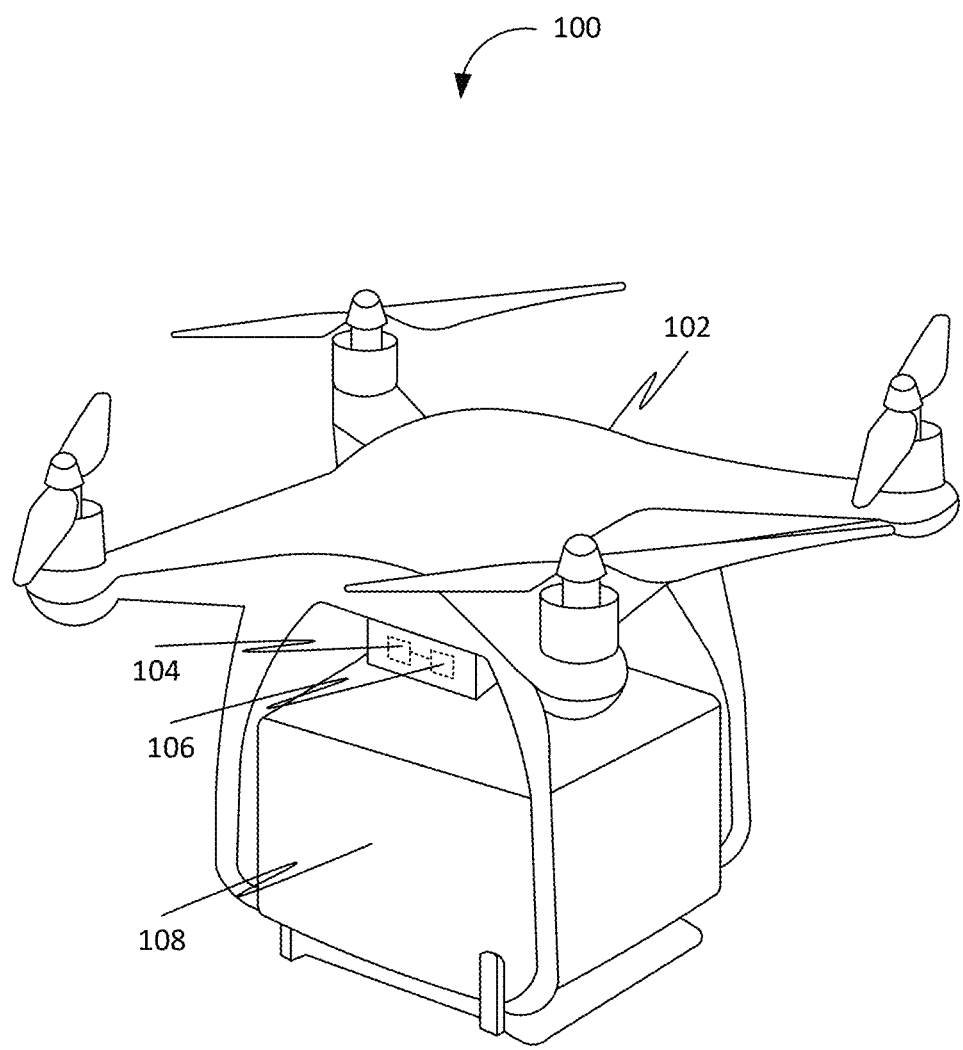
FIG. 1 is a top perspective view of an apparatus 100 for provisioning assistance to users in performing activities, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of provisioning assistance to users in performing activities, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for provisioning assistance to users in performing activities.

Further, the present disclosure describes an apparatus for provisioning assistance to users in performing activities. Further, the apparatus may include a drone. Further, the drone may be a mini flying drone.

The drone may include a carriage (such as a backpack) that contains various items that are required by the drone. Further, the items may include a battery (a battery pack). The battery is chargeable using a power system comprised in a house. Further, the battery is chargeable through solar panels that are paper-thin. These solar panels remain active while the drone is being used. Further, the drone may be automatically charged through power lines. Further, an amount of money from an account may be deducted for charging the drone.

Further, the apparatus may include an air conditioner mounted on the drone. Further, at least one component of the drone may use the water generated by the air conditioner, filter it, and dispense it on the person as a mist.

Further, the apparatus may include modular attachments attachable to the drone. Further, the modular attachments are of the drone. Further, the modular attachments may include a speed camera for a police officer, a gun for a soldier, and an air conditioner unit for a person.

Further, the apparatus may be a firefighter companion drone. Further, the apparatus may have advanced sensors that allow the apparatus to navigate through smoke-filled environments and detect obstacles. Further, the apparatus may have Artificial intelligence (AI) powered navigation that allows the apparatus to utilize artificial intelligence to autonomously map and search for lost firefighters. Further, the apparatus may provide accurate and up-to-date location information of firefighters to rescue teams. Further, the apparatus may perform smoke dispersal by releasing a fine mist of water or fire retardant to temporarily clear smoke and improve visibility. Further, the apparatus enhances firefighter safety by reducing risks for firefighters by providing crucial information and improving working conditions. Further, the apparatus increases the effectiveness of firefighting operations by aiding in search and rescue and enhancing visibility.

Further, the apparatus may be a shooting drone. Further, the apparatus may include a camera with a flexible lens. Further, the camera with the flexible lens may easily be able to zoom in and out with a clear vision. Further, the camera with a flexible lens has a high frame rate. Further, the apparatus is aware of the shooter's technique and flies accordingly to observe the shooter's technique. Further, the apparatus uses algorithms to see what the shooter is doing wrong. The camera captures the movement of the pellet. Further, the apparatus provides information based on the shooter's health and physical conditions. Further, the information provided by the apparatus may be used to improve the algorithms. Further, the apparatus notes the mistakes made by the shooter in previous shots of the shooter and advises the shooter if the shooter repeats the mistake. Further, the apparatus provides a short crisp beneficial advice. The apparatus does not provide a general advice. Further, the advice is provided by performing analytics of shooting performed by the shooter. Further, a sound made by the apparatus while flying is absent or minimal when the apparatus is flying around the person. The apparatus silently flies while observing the shooter. Further, the apparatus may be positioned in a position using a tripod, the apparatus while positioned on the tripod captures the pellet shot by the shooter while shooting. Further, the apparatus provides analytics of the shooter's performance to the shooter.

Further, the apparatus may include a sports drone. Further, the sports drone may be a drone for sports. Further, the apparatus has a rapid deployment feature, in which the apparatus is capable of quickly launching and flying to designated search areas. Further, the quick launching and flying maximizes search time for the apparatus. Further, the apparatus may have advanced sensors, as the apparatus is equipped with high-resolution cameras, thermal imaging, and LiDAR for day and night search capabilities. Further, the apparatus may be able to conduct pre-programmed search patterns or follow real-time adjustments based on terrain and conditions. Further, the apparatus sends high-quality video and image data directly to ground teams in real-time for immediate analysis.

Further, the sports drone may be for any sport. Further, the apparatus may provide and/or present information to a climber doing climbing in an intuitive way. Further, the apparatus may be able to give audio and visual feedback, check if gripping areas are unstable, be able to check obstacles, and generate warnings, if the climber is injured, can give the climber's location to rescue teams and an SOS call as well.

Further, the apparatus may have two-way communication capability. Further, the apparatus is equipped with a speaker and a microphone for allowing direct communication with lost hikers to provide guidance and reassurance to the lost hikers. Further, the apparatus has an emergency payload delivery capability. Further, the apparatus may deliver essential survival supplies like first aid kits, food, or water to stranded hikers. Further, the apparatus may be designed to have extended flight times to cover large search areas without frequent battery changes and/or charging.

Further, the apparatus has an improved search efficiency as the apparatus reduces search time and increases the likelihood of finding lost individuals. Further, the apparatus has an enhanced situational awareness as the apparatus provides real-time data and visual information to ground teams. Further, the apparatus has an improved communication ability as the apparatus enables direct communication with lost hikers, providing comfort and guidance. Further, the apparatus has an emergency assistance ability as the apparatus may deliver essential supplies to stranded hikers and potentially save lives. Further, the apparatus is versatile as the apparatus may be used for various search and rescue missions, including wilderness search, disaster response, and law enforcement operations.

Further, the apparatus may be a forest fire detection drone. Further, the apparatus may include modernized sensors that may be able to detect forest fires easily. Further, the navigation of the apparatus is powered using artificial intelligence. Further, the sensors onboard the apparatus sense any indications of a forest fire. Further, the apparatus may include additional sensors for sensing dryness, wind, temperature, and lightning. Further, the apparatus communicates an instance of the forest fire to individuals and concerned authorities. Further, the apparatus may monitor people during camping. Further, the apparatus is able to extinguish fires. Further, the apparatus is able to connect and call other drones (water drones) if a forest fire is sensed. Further, a processor enabled with artificial intelligence onboard the apparatus gathers the data, wind speed, wind direction, etc., to make steps on how to extinguish the forest fire. Further, the sensors onboard the apparatus may include a light detection and ranging (LIDAR) sensor, temperature and humidity sensors, and a Silvanet wildfire sensor. Further, the LIDAR sensor employs a remote sensing method to examine the surface of the earth. Further, the temperature and humidity sensors may be used to measure the temperature and humidity levels in the forest environment. These data can help predict the fire danger level, assess the likelihood of fire, and take appropriate fire prevention measures. Further, the Silvanet wildfire sensor is designed to sense forest fires within minutes and often during their early smoldering phase, greatly reducing the risk of them spreading out of control. Further, the apparatus may include a radio for enabling communication with other drones. Further, the radio uses RF (radio frequency) signals in bands such as HF (high frequency) and UHF (ultra-high frequency) for communicating with other drones. Further, the apparatus may communicate with each other and with human operators through various methods, such as radio, Wi-Fi, Bluetooth, cellular, or satellite networks. Depending on the type and range of the communication system, the apparatus transmits data, images, videos, or voice messages in real time or with minimal delay.

Further, the apparatus may include a scarecrow drone. Further, the apparatus has a mobility to move around the field and go near areas where birds and pests are. Further, the apparatus may monitor fields and provide advice to farmers on how they can increase their yield. Further, the apparatus identifies pests and insects on the spot and treats them through a required treatment at the moment. Further, the apparatus may be designed to look intimidating to animals and scare the animals. The apparatus acts as a subordinate to the scarecrow. Further, the apparatus uses AI algorithms, to give good advice and details for each point, identify different pests, and employ a laser gun to kill pests quickly with no trouble.

Further, the present disclosure describes a process employed to identify pests and insects on the spot and should know how to treat them at the moment. Further, the process starts with step A of start. After step A, the process moves to step B of mobility check. After step B, the process moves to step C of field scanning. After step C, the process moves to step D a determination of identification of an area is made. If the determination is positive, then after step D, the process moves to step E of monitoring and data collection. If the determination is negative, then after step D, the process moves to F which is the end of the process. After step E, the process moves to step G where an identification of pests and insects is made. If the identification is positive, then the process moves to step H of pest identification and treatment. If the identification is negative, then the process moves to step I of providing yield advice to farmers. After step H, the process moves to step J in which the availability of treatment is determined. If the treatment is available, the process moves to step K of applying treatment after step J. If the treatment is not available, the process moves to step I after step J. After step I, the process moves to step L of data reporting. After step L, the process moves to step M which is the end of the process. After step I, the process moves to step N in which an intimidation check is performed. After step N, the process moves to step O in which a scaring away of animals is determined. If yes, then after step O, the process moves to step P of performing scarecrow coordination. If no, then after step O, the process moves to step Q of adjusting intimidation. After step P, the process moves to step R of continuing monitoring. After step Q, the process moves to step R. After step R, the process moves to step S which is the end of the process.

Further, the apparatus moves around easily. Further, the apparatus may include a soil moisture sensor, a thermal sensor, an electrochemical sensor, and an anemometer. Further, the soil moisture sensor provides a measure or estimate of the amount of water in the soil. Further, the thermal sensor may be used to detect the temperature in the atmosphere, it provides temperature measurement in a readable form thru an electrical signal. Further, the electrochemical sensor may be used to measure the level of phosphorus, potassium, calcium, sodium, nitrogen, etc. Further, the anemometer may be used to measure the wind speed.

Further, the apparatus has an intimidating look and is designed in a way that frightens animals. Animals are gullible, even a simple cloth would scare them. Further, the apparatus moves around as per the detections by the sensors, and if the apparatus finds something harmful and dangerous the apparatus contacts the farmer and informs the farmer immediately. Further, the apparatus may include a laser gun for killing insects. Further, the laser gun is used in fighting *thrips* and aphids, which can be killed even when located underneath the leaf. The laser from the laser gun doesn't harm the plants.

Further, the apparatus may include a drone. Further, the apparatus may have real-time biometric tracking for monitoring athlete's heart rate, respiration, and body temperature to assess exertion levels and potential health risks. Further, the apparatus may have 3D motion capture for accurately tracking athletes' movements, speed, acceleration, and spatial orientation for detailed performance analysis. Further, the apparatus captures high-resolution footage for frame-by-frame analysis. Further, the apparatus provides AI-powered insights by utilizing artificial intelligence to identify performance patterns, strengths, weaknesses, and areas for improvement. Further, the apparatus measures factors like wind speed, temperature, and humidity to assess their impact on athlete performance. Further, the apparatus shares real-time performance metrics with coaches and athletes for immediate feedback and adjustments. Further, the apparatus's advanced sensors ensure safe flight paths around athletes and the playing field, preventing collisions.

Further, the apparatus may include a referee drone. Further, the apparatus provides a bird's eye view of the entire field for accurate offside calls, foul assessments, and goal/no-goal decisions. Further, the apparatus offers instant replays of controversial plays for review by the referee or VAR. Further, the apparatus performs player tracking by monitoring player positions for offside and foul analysis. Further, the apparatus tracks the ball's movement for accurate out-of-bounds and goal-line technology. Further, the apparatus enables direct communication between the referee and VAR officials.

Further, the apparatus has the following application in the following sports:
- Football (Soccer): Offside calls, goal-line technology, foul assessments.
- Basketball: Out-of-bounds calls, foul analysis, player positioning.
- Tennis: Line calls, player tracking, ball speed analysis.
- Baseball: Foul ball calls, player tracking, home run verification.
- American Football: Offside calls, pass interference, ball tracking.

Further, the apparatus may be adapted to enhance performance analysis and refereeing in a wide range of sports.

Further, the apparatus may include a companion drone. Further, the apparatus is shaped like humans and accompanies the user and animals. Further, the apparatus may perform interaction with the users and animals. Further, the interaction is based on emotions and personalities. Further, the apparatus may interact with the users and animals based on information associated with the users and animals. For ex. If the apparatus accompanies a human the apparatus remembers what medicines a user has to take, what the user likes, etc. If the apparatus accompanies pets, the apparatus knows feeding time and the best way to play with the pets to enhance the learning of the pets.

Further, the present disclosure describes an apparatus for provisioning assistance to users in performing activities. Further, the apparatus may include a drone, at least one sensor, a processing device, and a communication device. Further, the drone may be configured for traversing between a plurality of positions by performing at least one movement autonomously. Further, the drone includes at least one movement mechanism. Further, the at least one movement mechanism is configured for generating at least one amount of a force in at least one direction in relation to the drone. Further, the force may be a thrust. Further, the performing of the at least one movement is based on the generating of the at least one amount of the force in the at least one direction. Further, the at least one sensor may be coupled with the drone. Further, the at least one sensor is configured for performing at least one sensing operation for assisting at least one user in performing at least one activity based on the traversing of the drone between the plurality of positions. Further, the at least one sensing operation includes at least one imaging operation. Further, the processing device may be coupled with the drone. Further, the processing device is communicatively coupled with the at least one sensor. Further, the processing device is configured for generating at least one sensor data associated with the at least one activity based on the performing of the at least one sensing operation. Further, the processing device is configured for analyzing the at least one sensor data using at least one machine learning model. Further, the at least one machine learning model is trained on at least one training data associated with the at least one activity. Further, the processing device is configured for determining at least one insight from the at least one sensor data based on the analyzing of the at least one sensor data. Further, the processing device is configured for generating at least one value for at least one movement operational parameter associated with the at least one movement mechanism based on the analyzing of the at least one sensor data. Further, the at least one movement mechanism is operatively coupled with the processing device. Further, the generating of the at least one amount of the force in the at least one direction is based on the at least one value of the at least one movement operational parameter. Further, the processing device is configured for generating at least one data based on the at least one insight and the at least one sensor data. Further, the communication device may be coupled with the drone. Further, the communication device is communicatively coupled with the processing device. Further, the communication device is configured for transmitting the at least one data to at least one device. Further, the at least one device is configured for performing at least one operation associated with the at least one activity based on the at least one data.

FIG. 1 is a top perspective view of an apparatus 100 for provisioning assistance to users in performing activities, in accordance with some embodiments. Accordingly, the apparatus 100 may include a drone 102, at least one imaging sensor 104, a processing device 106, and at least one device 108.

Further, the drone 102 may be configured to be at least one of positioned and moved to at least one of a plurality of positions. Further, at least one of the positioning and the moving of the drone 102 to at least one of the plurality of positions at least one of positions and moves the apparatus 100 to at least one of the plurality of positions. Further, the drone 102 may include a body and at least one movement assembly comprised in the body. Further, the at least one movement assembly may be electrically actuated and electrically powered. Further, the at least one movement assembly may include one or more of impellers, propellors, and fans, and one or more motors (such as electric motors) coupled with one or more of the impellers, the propellors, and the fans. Further, the at least one movement assembly may be configured for generating at least one amount of a force in at least one direction. Further, at least one of the positioning and the moving of the drone 102 may be based on the generating of the at least one amount of the force in the at least one direction. Further, the at least one direction may be in relation to the body. Further, the at least one movement assembly may include a movement mechanism, a propulsion mechanism, etc. Further, the at least one movement assembly may be associated with at least one operational parameter. Further, at least one of the positioning and the moving of the drone 102 to at least one of the plurality of positions may be based on at least one value of the at least one operational parameter. Further, the at least one operational parameter may include a force amount, a force direction, a force duration, etc. Further, the drone 102 may include an aerial drone, a land drone, a water drone, etc. Further, the drone 102 may include an unmanned vehicle, an unmanned autonomous vehicle (UAV), etc. Further, the positioning may include orienting, locating, stationing, placing, disposing, hovering, etc. Further, the moving may include traversing, flying, maneuvering, navigating, propelling, etc. Further, at least one of the plurality of positions may include a spatial location, a spatial position, etc.

Further, the at least one imaging sensor 104 may be coupled to the drone 102. Further, the at least one imaging sensor 104 may be configured for imaging an environment of the drone 102 based on at least one of the positioning and the moving of the drone 102 to at least one of the plurality of positions. Further, the environment may be associated with a region, an area, etc. Further, the imaging may be performed during at least one of the positioning and the moving of the drone 102 to at least one of the plurality of positions. Further, the imaging of the environment assists at least one user in performing at least one activity. Further, in an embodiment, the at least one user performing the at least one activity may be present in the environment. Further, in an embodiment, the at least one user performing the at least one activity may be absent from the environment. Further, the imaging may include visual light imaging, infrared light imaging, ultraviolet light imaging, X-ray imaging, multispectral imaging, hyperspectral imaging, thermal imaging, acoustic imaging, etc. Further, the imaging of the environment may include imaging persons, imaging objects, imaging environment, imaging events, imaging instances, etc. Further, the at least one imaging sensor 104 may include a visible light image sensor (camera), an infrared light camera, an ultraviolet image sensor, an X-ray camera, a multispectral image sensor, a hyperspectral image sensor, a thermal sensor, an acoustic sensor, etc. Further, the at least one user may include one or more individuals, one or more animals, etc. Further, the environment may include a surrounding of the drone 102, a surrounding of the at least one user, etc. Further, the at least one activity may include firefighting, shooting, climbing, trekking, hiking, walking, running, exercising, recording, game casting, sports casting, guarding, animal and bird scarring, animal and bird deterring, pest treating, pest controlling, individual tracking, object tracking, etc.

Further, the processing device 106 may be coupled to the drone 102. Further, the processing device 106 may be communicatively coupled with the at least one imaging sensor 104. Further, the processing device 106 may be configured for generating at least one imaging data based on the imaging. Further, the at least one imaging data may include one or more images, one or more videos, etc. Further, the processing device 106 may be configured for analyzing the at least one imaging data using at least one machine learning model. Further, the at least one machine learning model may include at least one convolutional neural network, at least one recurrent neural network, at least one transformer network, etc. Further, the at least one machine learning model may be trained using at least one training data. Further, the processing device 106 may be configured for generating at least one insight associated with the at least one activity based on the analyzing of the at least one imaging data. Further, the at least one insight may include an insight into a condition (a low visibility due to smoke) of the environment, an insight into an occurrence of an event (forest fire), an insight into a performance of the at least one user, an insight into a conduct of a sport, an insight into an effect of an organism, etc. Further, the processing device 106 may be configured for determining at least one operation based on the at least one insight. Further, the processing device 106 may be operatively coupled with the at least one movement assembly.

Further, the at least one device 108 may be coupled with the drone 102. Further, the at least one device 108 may be operatively coupled with the processing device 106. Further, the at least one device 108 may be configured for performing the at least one operation.

Figure 2:
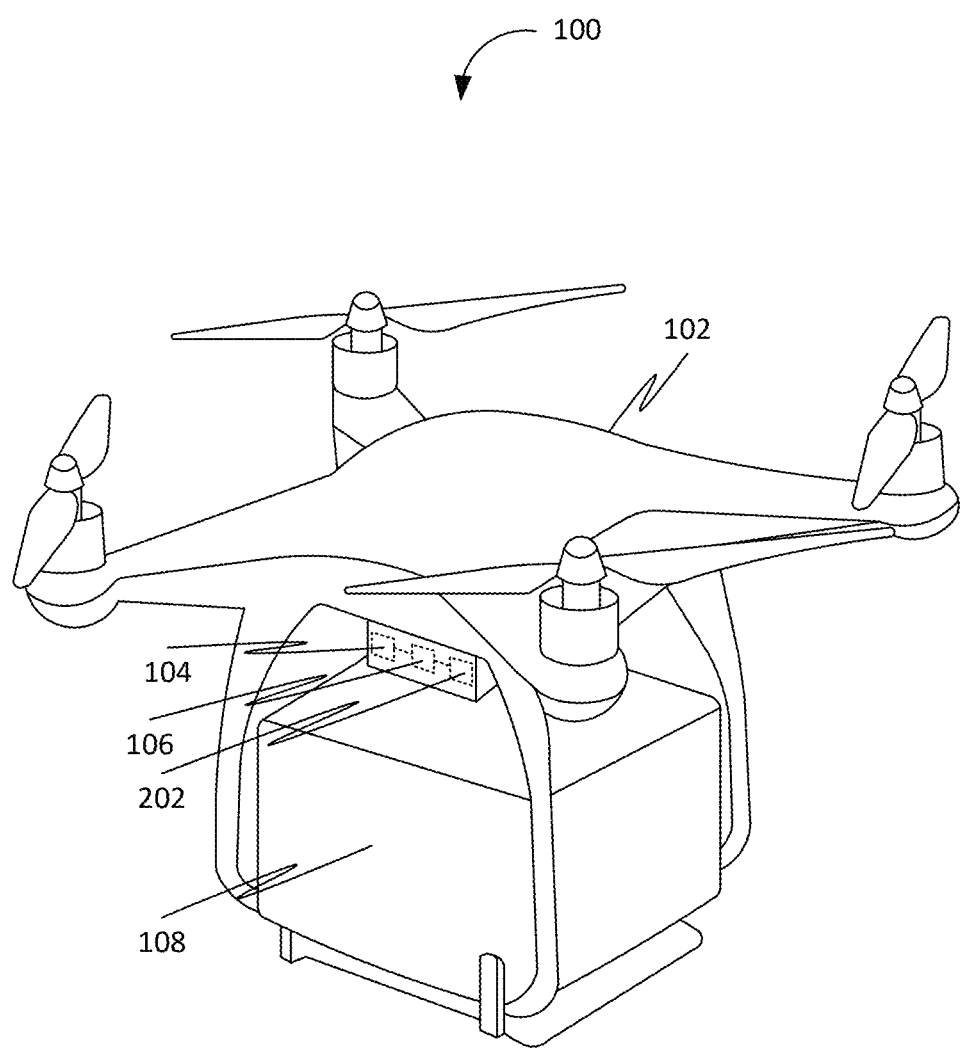
FIG. 2 is a top perspective view of the apparatus 100, in accordance with some embodiments.

In further embodiments, the apparatus 100 may include at least one geolocation sensor 202, as shown in FIG. 2. Further, the at least one geolocation sensor 202 may include a global positioning system (GPS) sensor, an accelerometer, a gyroscope, a Bluetooth low energy beacon, etc. Further, the at least one geolocation sensor 202 may be coupled to the drone 102. Further, the at least one geolocation sensor 202 may be communicatively coupled with the processing device 106. Further, the at least one geolocation sensor 202 may be configured for detecting a geolocation of the drone 102 based on at least one of the positioning and the moving of the drone 102 to at least one of the plurality of positions. Further, the processing device 106 may be configured for generating at least one geolocation data associated with the drone 102 based on the detecting of the geolocation. Further, the processing device 106 may be configured for analyzing the at least one geolocation data. Further, the generating of the at least one insight may be based on the analyzing of the at least one geolocation data. Further, the at least one insight may include a geolocation insight. Further, the geolocation insight may include a location based pattern.

Figure 3:
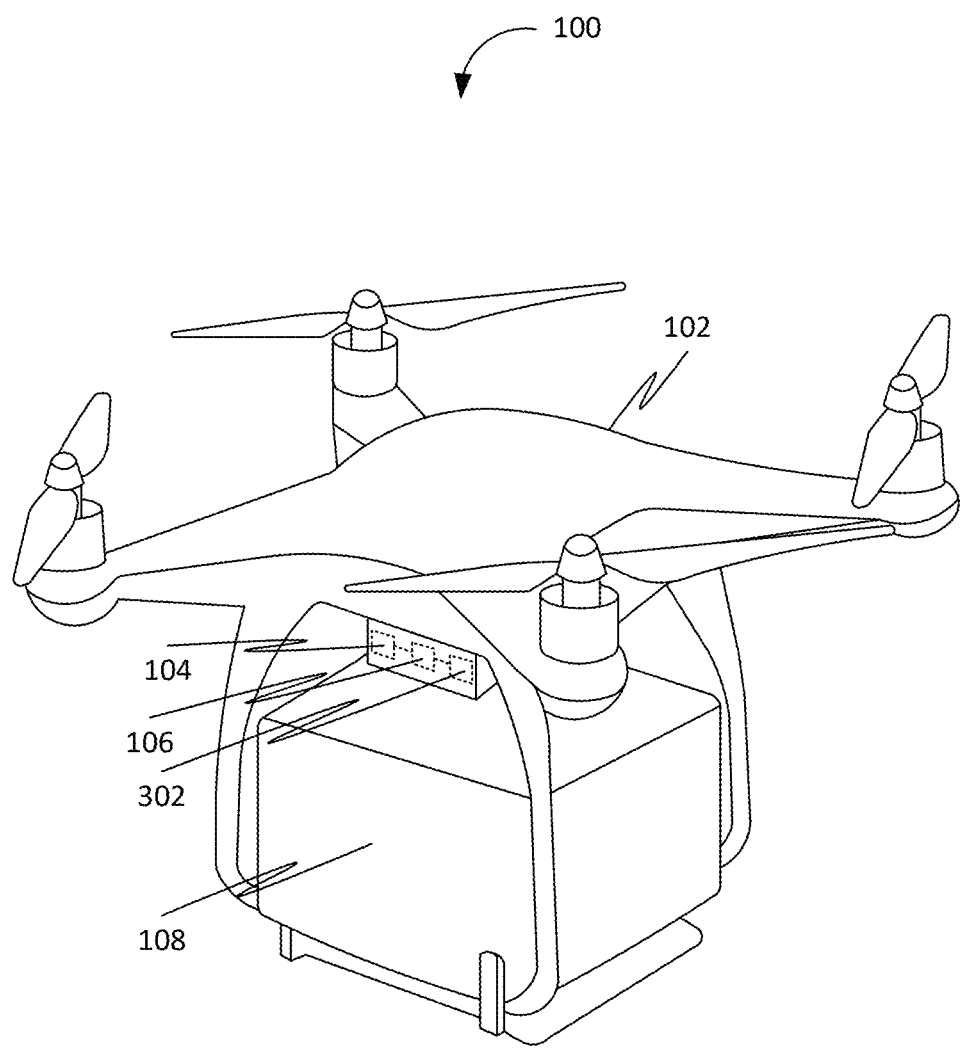
FIG. 3 is a top perspective view of the apparatus 100, in accordance with some embodiments.

In further embodiments, the apparatus 100 may include at least one user sensor 302, as shown in FIG. 3. Further, the at least one user sensor 302 may be attachable, wearable, disposable, etc., to the at least one user. Further, the at least one user sensor 302 may include an imaging sensor, a body temperature sensor, a body weight sensor, a motion sensor, a movement sensor, an electrocardiogram (ECG) sensor, an electromyography (EMG) sensor, an electroencephalogram (EEG) sensor, a pulse oximeter, a blood pressure sensor, a respiratory rate sensor, a glucose sensor, a galvanic skin response (GSR) sensor, a doppler ultrasound sensor, a bio-electrical impedance analysis (BIA) sensor, etc. Further, the at least one user sensor 302 may be communicatively coupled with the processing device 106. Further, the at least one user sensor 302 may be configured for detecting at least one of a physical state, a physiological state, and an emotional state of the at least one user associated with the at least one activity. Further, the processing device 106 may be configured for generating at least one user data of the at least one user based on the detecting of at least one of the physical state, the physiological state, and the emotional state of the at least one user. Further, the processing device 106 may be configured for analyzing the at least one user data. Further, the generating of the at least one insight may be further based on the analyzing of the at least one user data. Further, the at least one insight may include a user insight. Further, the user insight may include a performance pattern of the at least one user performing the at least one activity.

Figure 4:
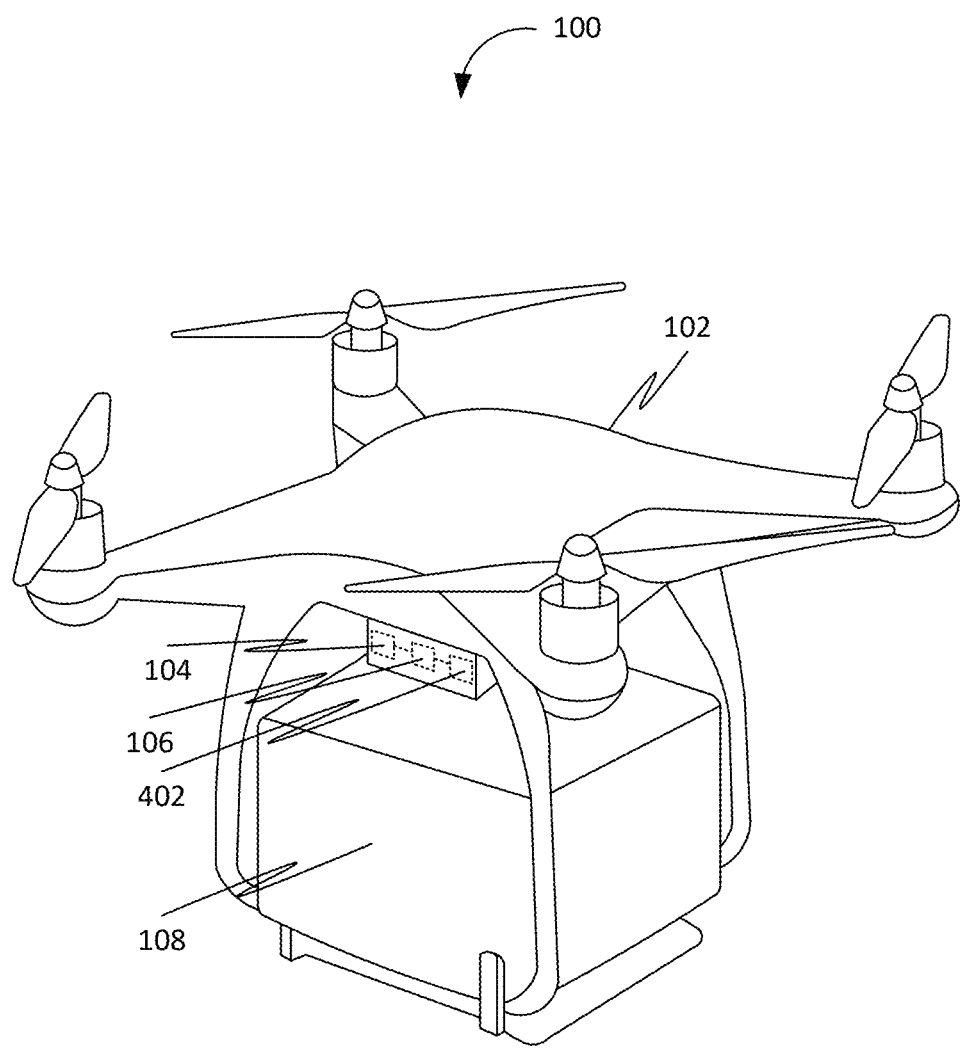
FIG. 4 is a top perspective view of the apparatus 100, in accordance with some embodiments.

In further embodiments, the apparatus 100 may include at least one motion sensor 402, as shown in FIG. 4. Further, the at least one motion sensor 402 may include an imaging sensor, an accelerometer, a gyroscope, a speed sensor, a movement sensor, a spatial orientation sensor, etc. Further, the at least one motion sensor 402 may be coupled to the drone 102. Further, the at least one motion sensor 402 may be communicatively coupled with the processing device 106. Further, the at least one motion sensor 402 may be configured for detecting at least one motion of at least one of at least one object associated with the at least one activity and the at least one user associated with the at least one activity. Further, the at least one object may include at least one article, at least one item (such as football, basketball, puck, tennis ball, baseball ball, etc.), etc. Further, the processing device 106 may be further configured for generating at least one motion data based on the detecting of the at least one motion of at least one of the at least one object and the at least one user. Further, the processing device 106 may be configured for analyzing the at least one motion data. Further, the generating of the at least one insight may be further based on the analyzing of the at least one motion data. Further, the at least one insight may include a motion insight of the at least one user, a motion insight of the at least one object, etc.

Further, in some embodiments, the processing device 106 may be further configured for determining at least one of a plurality of subsequent positions for the drone 102 after at least one of the positioning and the moving of the drone 102 to at least one of the plurality of positions based on the analyzing of the at least one imaging data. Further, the processing device 106 may be configured for generating at least one command for the drone 102 based on the determining of at least one of the plurality of subsequent positions. Further, the drone 102 may be operatively coupled with the processing device 106. Further, the drone 102 may be configured for at least one of positioning and moving to at least one of the plurality of subsequent positions after at least one of the positioning and the moving of the drone 102 to at least one of the plurality of positions based on the at least one command. Further, at least one of the positioning and the moving to at least one of the plurality of subsequent positions after at least one of the positioning and the moving of the drone 102 to at least one of the plurality of positions may include navigating, maneuvering, etc.

Figure 5:
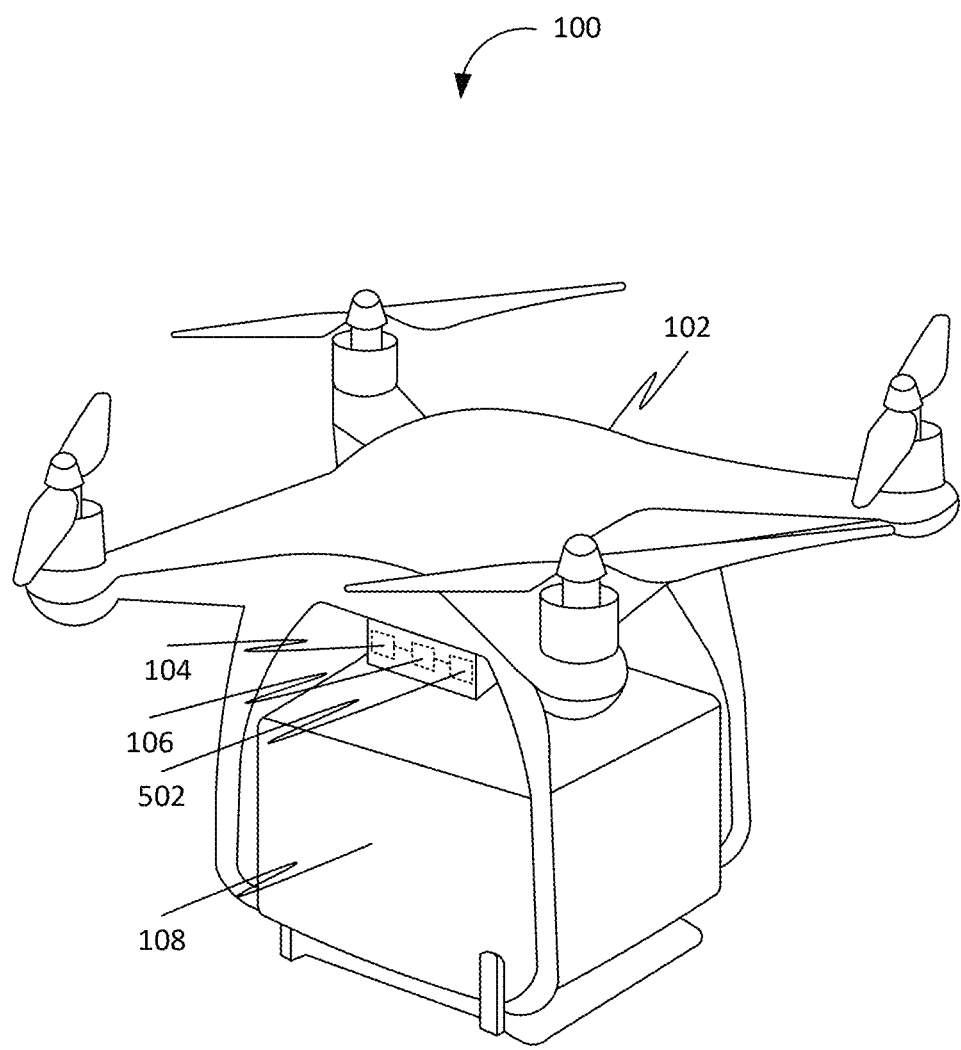
FIG. 5 is a top perspective view of the apparatus 100, in accordance with some embodiments.

In further embodiments, the apparatus 100 may include a storage device 502, as shown in FIG. 5. Further, the storage device 502 may be coupled with the drone 102. Further, the storage device 502 may be communicatively coupled with the processing device 106. Further, the storage device 502 may be configured for retrieving at least one activity data associated with the at least one activity. Further, the at least one activity data may include at least one parameter of the at least one activity, at least one objective of the at least one activity, at least one requirement associated with the at least one activity, at least one constraint of the at least one activity, etc. Further, the at least one activity data may include at least one behavior data of at least one behavior of the at least one user performing the at least one activity, at least one technique data of at least one technique of the at least one user performing the at least one user, etc. Further, the processing device 106 may be configured for analyzing the at least one activity data. Further, the processing device 106 may be configured for determining at least one of the plurality of positions for the drone 102 based on the analyzing of the at least one activity data. Further, the processing device 106 may be configured for generating at least one first command for the drone 102 based on the determining of at least one of the plurality of positions of the drone 102. Further, at least one of the positioning and the moving of the drone 102 to at least one of the plurality of positions may be based on the at least one first command.

Figure 6:
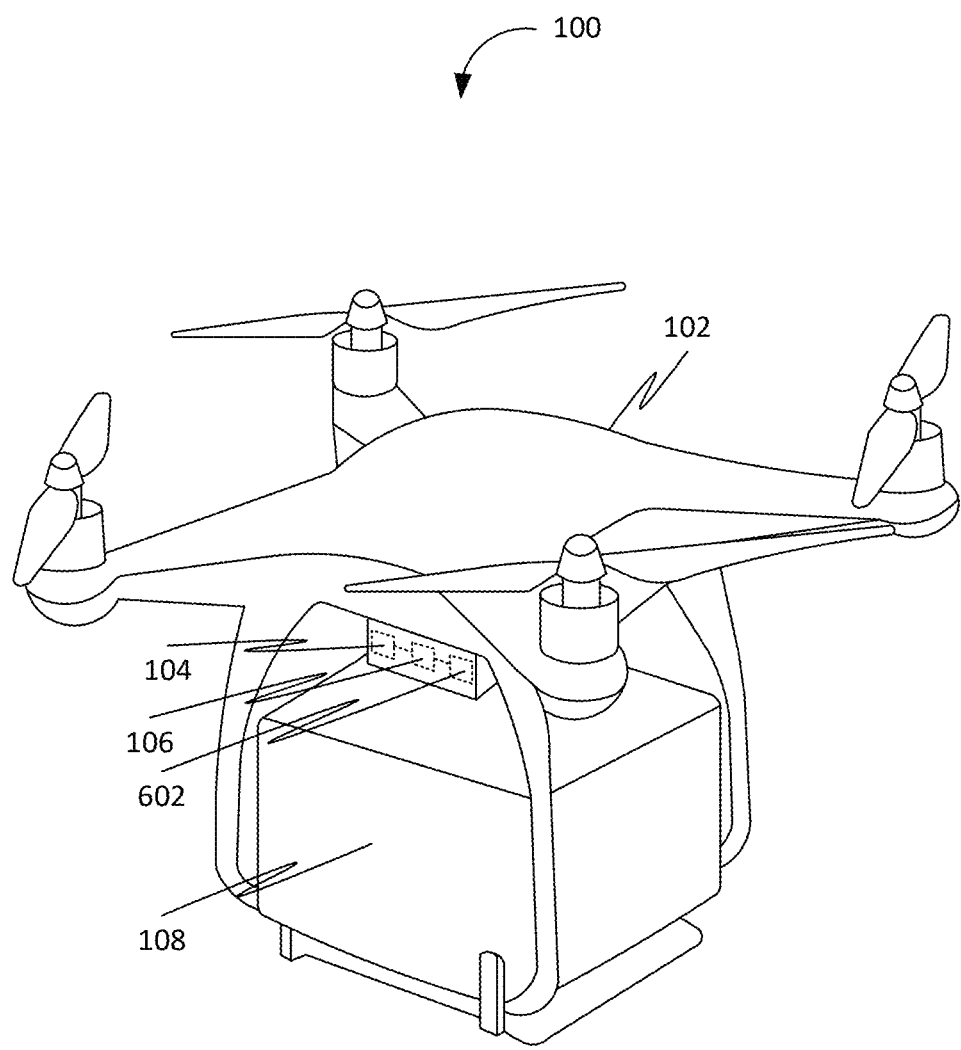
FIG. 6 is a top perspective view of the apparatus 100, in accordance with some embodiments.

In further embodiments, the apparatus 100 may include at least one environment sensor 602, as shown in FIG. 6. Further, the at least one environment sensor 602 may include a temperature sensor, a wind direction sensor, a light sensor, a precipitation sensor, a humidity sensor, a soil moisture sensor, an electrochemical sensor, an anemometer, etc. Further, the at least one environment sensor 602 may be coupled to the drone 102. Further, the at least one environment sensor 602 may be communicatively coupled with the processing device 106. Further, the at least one environment sensor 602 may be configured for detecting at least one environmental condition of the environment. Further, the at least one environmental condition may include a temperature, a pressure, a wind direction, a humidity, a precipitation, an ambient light, a fire, a soil moisture, a chemical composition, a wind speed, etc. Further, the processing device 106 may be configured for generating at least one environment data for the at least one environmental condition based on the detecting of the at least one environmental condition. Further, the processing device 106 may be configured for analyzing the at least one environment data using the at least one machine learning model. Further, the generating of the at least one insight may be based on the analyzing of the at least one environment data.

Figure 7:
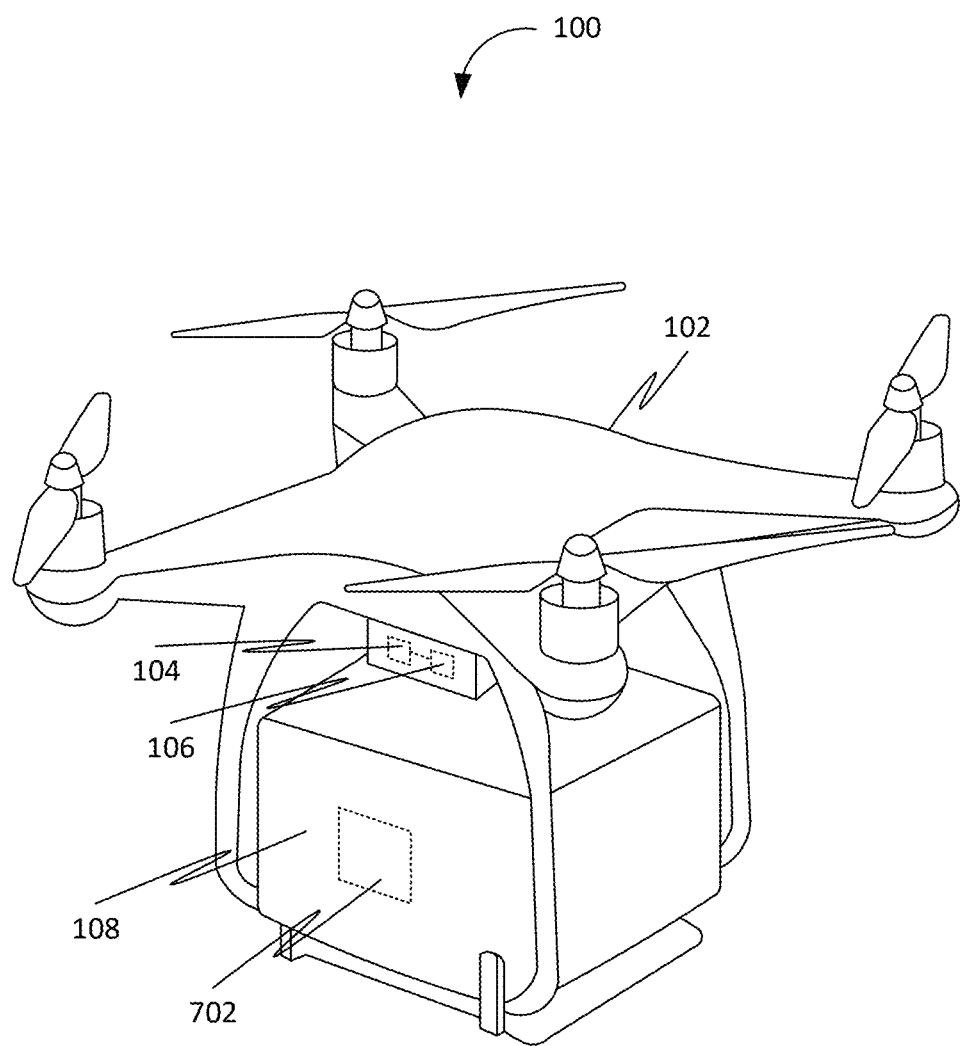
FIG. 7 is a top perspective view of the apparatus 100, in accordance with some embodiments.

Further, in some embodiments, the at least one device 108 may include a communication device 702, as shown in FIG. 7. Further, the communication device 702 may be communicatively coupled with the processing device 106. Further, the communication device 702 may be configured for transmitting at least one of the at least one imaging data and the at least one insight to at least one external device. Further, the at least one external device may include a user device, an output device, a presentation device, a client device, a computing device, etc. Further, the performing of the at least one operation may include the transmitting of at least one of the at least one imaging data and the at least one insight.

Figure 8:
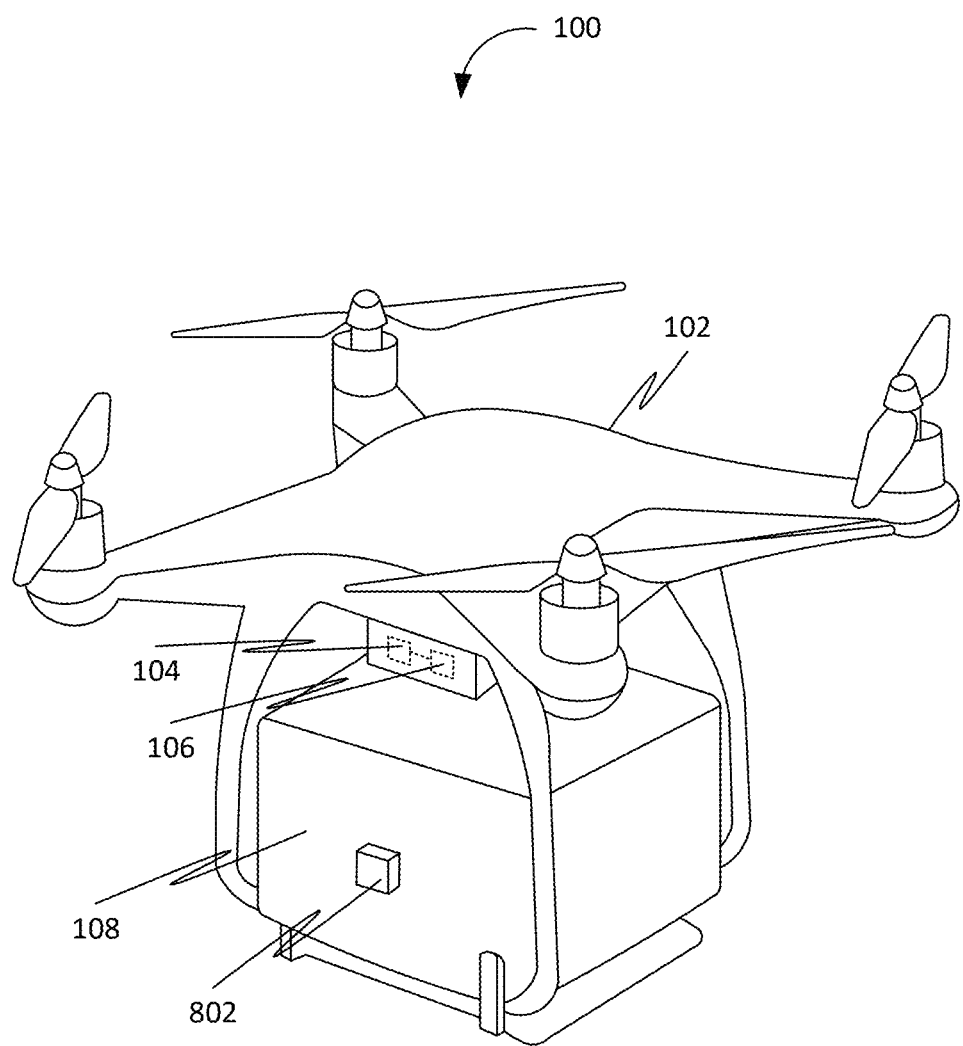
FIG. 8 is a top perspective view of the apparatus 100, in accordance with some embodiments.

Further, in some embodiments, the at least one device 108 may include at least one dispenser 802, as shown in FIG. 8. Further, the at least one dispenser 802 may be configured for dispensing at least one amount of at least one fluid supplied to the at least one dispenser 802. Further, the at least one amount of the at least one fluid may be dispensed in the environment. Further, the performing of the at least one operation may include the dispensing of the at least one amount of the at least one fluid. Further, the at least one fluid may include water, mist, fire retardant, smoke repressant, etc. Further, the dispensing of the at least one amount of the at least one fluid may include dispensing the at least one amount of the at least one fluid in the environment. Further, the at least one dispenser 802 may include at least one container and at least one dispensing mechanism coupled to the at least one container. Further, the at least one container stores the at least one fluid. Further, the at least one dispensing mechanism transitions between a closed state and an opened state. Further, the at least one dispensing mechanism allows dispensing of the at least one fluid from the at least one container in the opened state. Further, the at least one dispensing mechanism restricts dispensing of the at least one fluid from the at least one container. Further, the at least one dispensing mechanism may include a pump dispenser, a rotary dispenser, a piston dispenser, a valve based dispenser, a spring loaded dispenser, etc. Further, the at least one dispensing mechanism may be electrically actuated.

Figure 9:
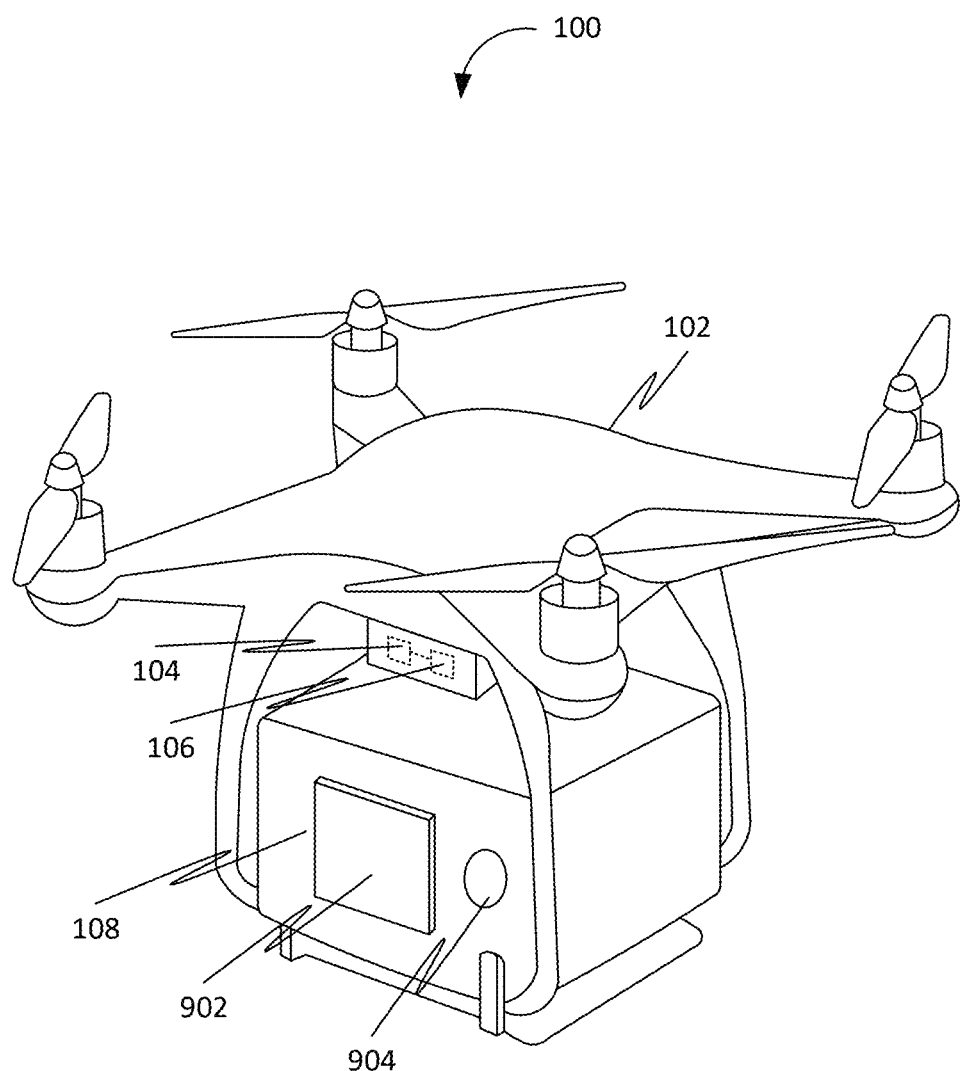
FIG. 9 is a top perspective view of the apparatus 100, in accordance with some embodiments.

Further, in some embodiments, the at least one device 108 may include at least one presentation device 902-904, as shown in FIG. 9. Further, the at least one presentation device 902-904 may be communicatively coupled with the processing device 106. Further, the at least one presentation device 902-904 may be configured for presenting at least one of the at least one insight and the at least one imaging data to the at least one user. Further, the performing of the at least one operation may include the presenting of at least one of the at least one insight and the at least one imaging data. Further, the at least one presentation device 902-904 may include a display device, a speaker, a projector, a display screen, etc.

Figure 10:
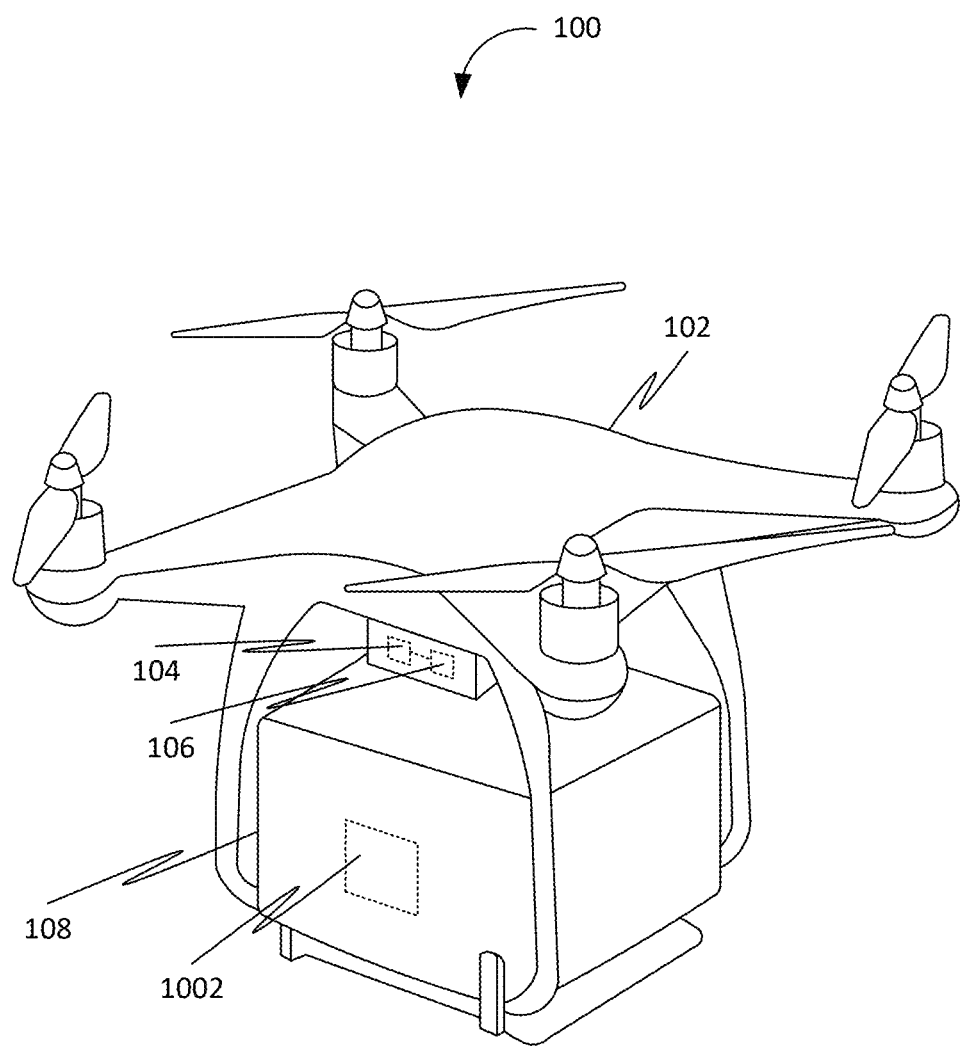
FIG. 10 is a top perspective view of the apparatus 100, in accordance with some embodiments.

Further, in some embodiments, the at least one device 108 may include at least one object delivering device 1002, as shown in FIG. 10. Further, the at least one object delivering device 1002 may be configured for delivering at least one object carried by the drone 102 using the at least one object delivering device 1002 to the at least one user. Further, the at least one object may include an item, an article, a payload, etc. Further, the performing of the at least one operation may include the delivering of the at least one object. Further, the at least one object delivering device 1002 may include a carriage, a holder, a gripper, etc. Further, the at least one object delivering device 1002 transitions between a first state and a second state. Further, the at least one object received by the at least one object delivering device 1002 may be secured to the drone 102 in the first state. Further, the at least one object may be released from the drone 102 in the second state. Further, the at least one object delivering device 1002 may be electrically actuated.

Figure 11:
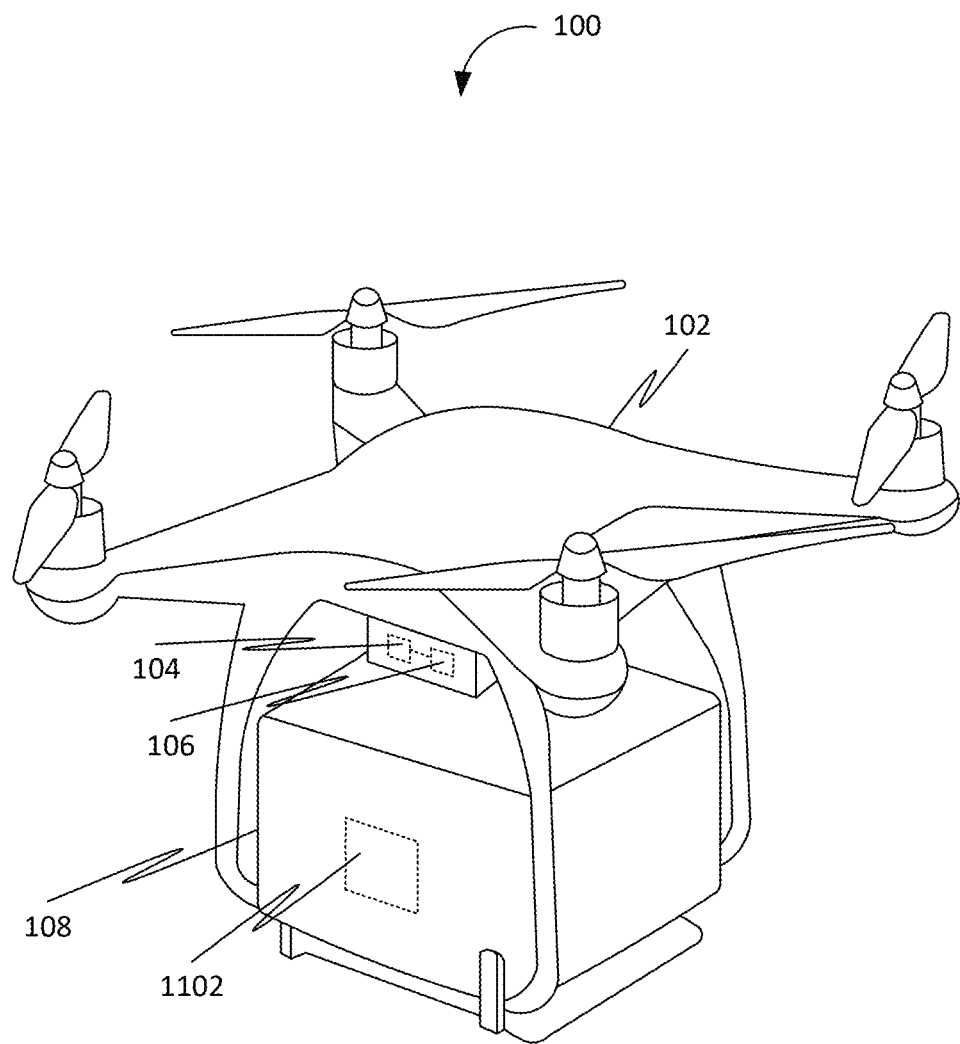
FIG. 11 is a top perspective view of the apparatus 100, in accordance with some embodiments.

Further, in some embodiments, the at least one device 108 may include an additional communication device 1102, as shown in FIG. 11. Further, the additional communication device 1102 may include a radio device, a transceiver device, etc. Further, the additional communication device 1102 may be configured for establishing a two way communication between the at least one device 108 and at least one external device. Further, the at least one external device may include a computing device, a client device, a user device, etc. Further, the establishing of the two way communication allows the at least one user at least one of send and receive at least one information through the at least one device 108. Further, the performing of the at least one operation may include the establishing of the two way communication. Further, the at least one device 108 may include an input device and an output device. Further, the input device captures the at least one information from the at least one user. Further, the output device outputs the at least one information.

Further, in some embodiments, the processing device 106 may be configured for recognizing at least one organism present in at least one region based on the analyzing of the at least one imaging data. Further, the at least one organism may include an animal, an insect, a pest, a bird, etc. Further, the processing device 106 may be configured for generating at least one organism data of the at least one organism based on the recognizing of the at least one organism and the analyzing of the at least one imaging data. Further, the at least one organism data may include a kind of the at least one organism, a location of the at least one organism, a type of the at least one organism, a state of the at least one organism, a movement of the at least one organism, a harm posed by the at least one organism, etc. Further, the processing device 106 may be configured for analyzing the at least one organism data based on at least one additional data. Further, the at least one additional data may include a dataset of a plurality of organisms. Further, the generating of the at least one insight based on the analyzing of the at least one organism data.

Figure 12:
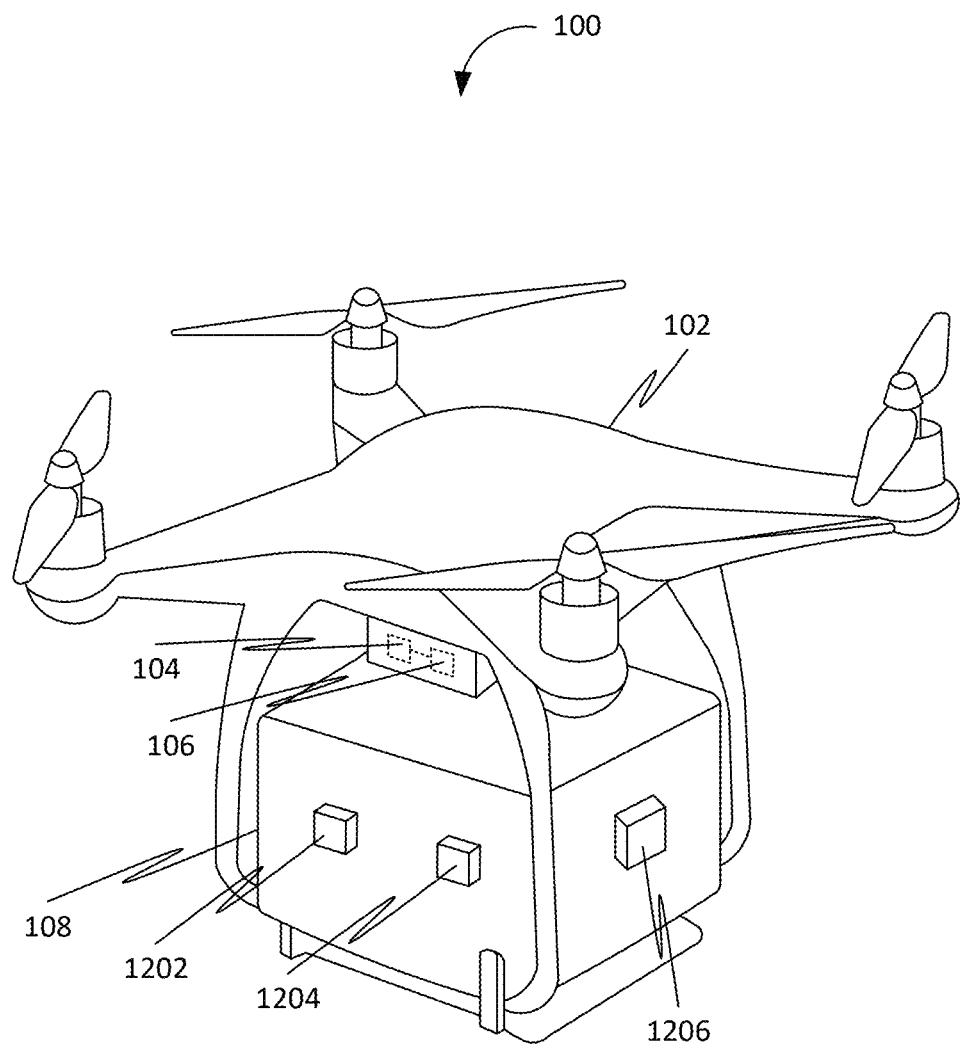
FIG. 12 is a top perspective view of the apparatus 100, in accordance with some embodiments.

Further, in an embodiment, the at least one device 108 may include a plurality of devices 1202-1206, as shown in FIG. 12. Further, the determining of the at least one operation may include selecting the at least one operation from a plurality of operations based on the at least one insight. Further, the processing device 106 may be configured for selecting at least one first device 1202, as shown in FIG. 12, from the plurality of devices 1202-1206 based on the selecting of the at least one operation. Further, the at least one first device 1202 is configured for performing the at least one operation based on the selecting of the at least one first device 1202. Further, the performing of the at least one operation treats the at least one organism with at least one treatment. Further, the at least one first device 1202 may include a laser gun, a pesticide dispenser, a speaker, etc. Further, the at least one operation may include irradiating, dispensing, emitting, etc. Further, the at least one treatment may include a laser irradiating, a pesticide dispensing, a sound emitting, etc. Further, the performing of the at least one operation corresponds to the at least one treatment.

Further, in an embodiment, the processing device 106 may be configured for generating at least one first imaging data after the performing of the at least one operation based on the imaging. Further, the processing device 106 may be configured for analyzing the at least one first imaging data using the at least one machine learning model. Further, the processing device 106 may be configured for generating at least one first insight after the performing of the at least one operation based on the analyzing of the at least one first imaging data and the recognizing of the at least one organism. Further, the processing device 106 may be configured for determining at least one first operation based on the at least one first insight. Further, the at least one first device 1202 may be further configured for performing the at least one first operation. Further, the performing of the at least one first operation treats the at least one organism with the at least one first treatment. Further, a first intensity of the at least one first treatment may be greater than an intensity of the at least one treatment. Further, the intensity corresponds to a level of irradiation, an amount of pesticide, a volume of sound, etc. Further, the at least one first treatment may be similar to the at least one treatment.

Further, in an embodiment, the processing device 106 may be further configured for generating at least one second imaging data after the performing of the at least one operation based on the imaging. Further, the processing device 106 may be configured for analyzing the at least one second imaging data using the at least one machine learning model. Further, the processing device 106 may be configured for generating at least one second insight after the performing of the at least one operation based on the analyzing of the at least one second imaging data and the recognizing of the at least one organism. Further, the at least one second insight may include a life status of the at least one organism, a harm causing ability of the at least one organism, a position of the at least one organism, etc. Further, the processing device 106 may be configured for determining at least one second operation based on the at least one second insight. Further, the processing device 106 may be configured for selecting at least one second device 1206, as shown in FIG. 12, from the plurality of devices 1202-1206 based on the determining of the at least one second operation. Further, the at least one second device 1206 may be configured for performing the at least one second operation based on the selecting of the at least one second device 1206. Further, the performing of the at least one second operation treats the at least one organism with at least one second treatment. Further, the at least one second treatment may be distinct from the at least one treatment.

Further, in an embodiment, the processing device 106 may be configured for determining at least one first position for the drone 102 based on the at least one insight. Further, the at least one first position correspond to a movement of the drone 102, a movement pattern of the drone 102, an orientation of the drone 102, a location of the drone 102, etc. Further, the at least one insight may include a location and a position of obstacles in the environment, a visibility in the environment, a proximity to a terrain, an environmental condition of the environment, a requirement of the at least one activity, a presence of the at least one organism, a harm posed by the at least one organism, etc. Further, the processing device 106 may be configured for generating at least one second command for the drone 102 based on the determining of the at least one first position. Further, the drone 102 may be operatively coupled with the processing device 106. Further, the drone 102 may be configured for at least one of positioning and moving to the at least one first position based on the at least one second command. Further, in an embodiment, the drone 102 may be colored with at least one bright color (such as bright red, bright yellow, bright orange, etc.). Further, the drone 102 may be coated with at least one reflective material. Further, the at least one reflective material may include a polished metal foil, a reflective paint, Mylar, mirror, etc. Further, at least one surface of the drone 102 may be a reflective surface. Further, the at least one reflective material and the reflective surface reflects light and shines. Further, the body of the drone 102 may be at least partially shaped as a body part of a predatory animal.

Figure 13:
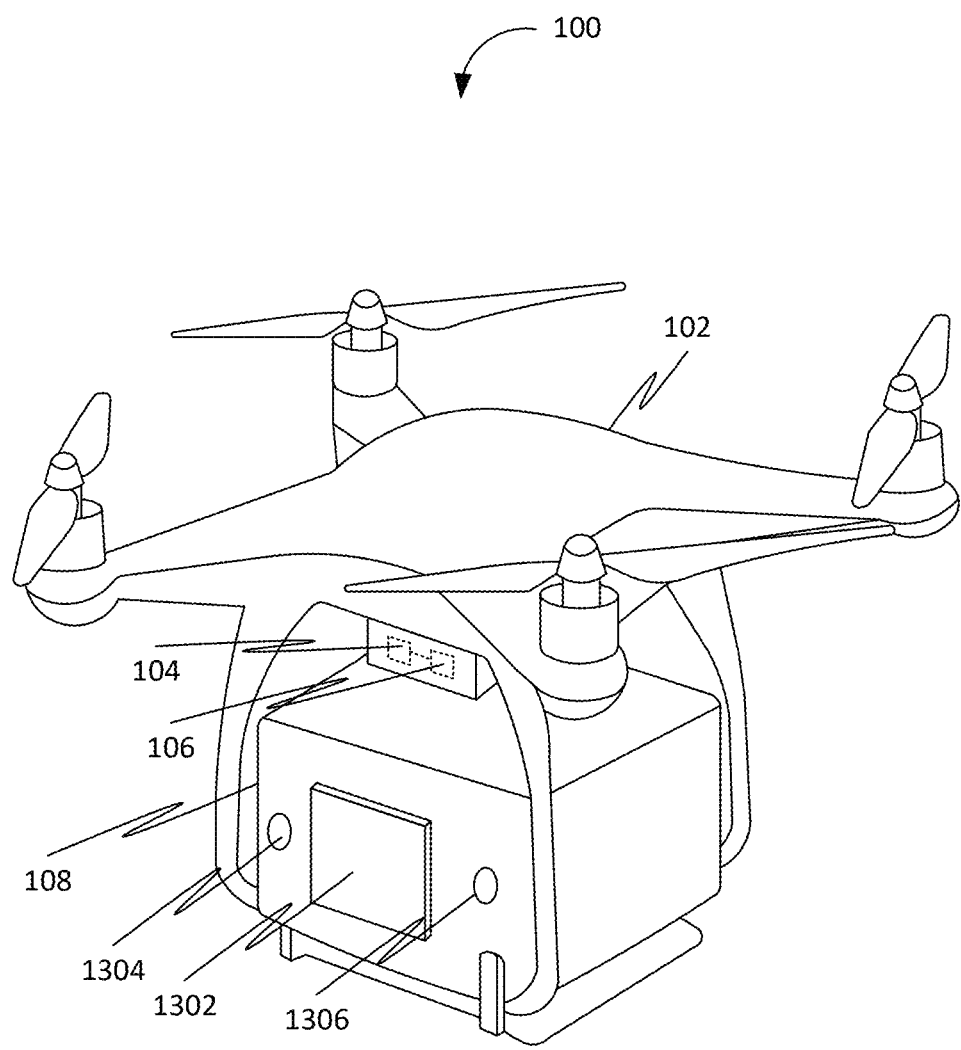
FIG. 13 is a top perspective view of the apparatus 100, in accordance with some embodiments.

Further, the at least one device 108 may include at least one interaction device 1302-1306, as shown in FIG. 13. Further, the at least one interaction device 1302-1306 may be communicatively coupled with the processing device 106. Further, the at least one interaction device 1302-1306 is configured for conducting at least one interaction with the at least one user. Further, the performing of the at least one operation may include the conducting of the at least one interaction with the at least one user. Further, the at least one interaction device 1302-1306 may include at least one output device and at least one input device. Further, the processing device 106 may be configured for generating at least one response for the at least one user using at least one generative model. Further, the at least one interaction device 1302-1306 may be configured for presenting the at least one response to the at least one user. Further, the at least one interaction device 1302-1306 may be configured for receiving at least one input from the at least one user. Further, the generating of the at least one response may be based on the at least one input. Further, the generating of the at least one response may be based on the analyzing of the at least one imaging data. Further, the generating of the at least one response may be based on at least one user data of the at least one user. Further, the at least one user data may include a preference, a requirement, etc., of the at least one user. Further, the at least one generative model may be associated with at least one personality. Further, the at least one response may be in accordance with the at least one personality. Further, the at least one generative model may include an autoregressive model, a long short-term memory network, a generative pre-trained model, a bidirectional encoder representation from transformer, a bidirectional and auto-regressive transformers, etc. Further, the body of the drone 102 may be at least partially anthropomorphically shaped.

FIG. 2 is a top perspective view of the apparatus 100, in accordance with some embodiments.

FIG. 3 is a top perspective view of the apparatus 100, in accordance with some embodiments.

FIG. 4 is a top perspective view of the apparatus 100, in accordance with some embodiments.

FIG. 5 is a top perspective view of the apparatus 100, in accordance with some embodiments.

FIG. 6 is a top perspective view of the apparatus 100, in accordance with some embodiments.

FIG. 7 is a top perspective view of the apparatus 100, in accordance with some embodiments.

FIG. 8 is a top perspective view of the apparatus 100, in accordance with some embodiments.

FIG. 9 is a top perspective view of the apparatus 100, in accordance with some embodiments.

FIG. 10 is a top perspective view of the apparatus 100, in accordance with some embodiments.

FIG. 11 is a top perspective view of the apparatus 100, in accordance with some embodiments.

FIG. 12 is a top perspective view of the apparatus 100, in accordance with some embodiments.

FIG. 13 is a top perspective view of the apparatus 100, in accordance with some embodiments.

Figure 14:
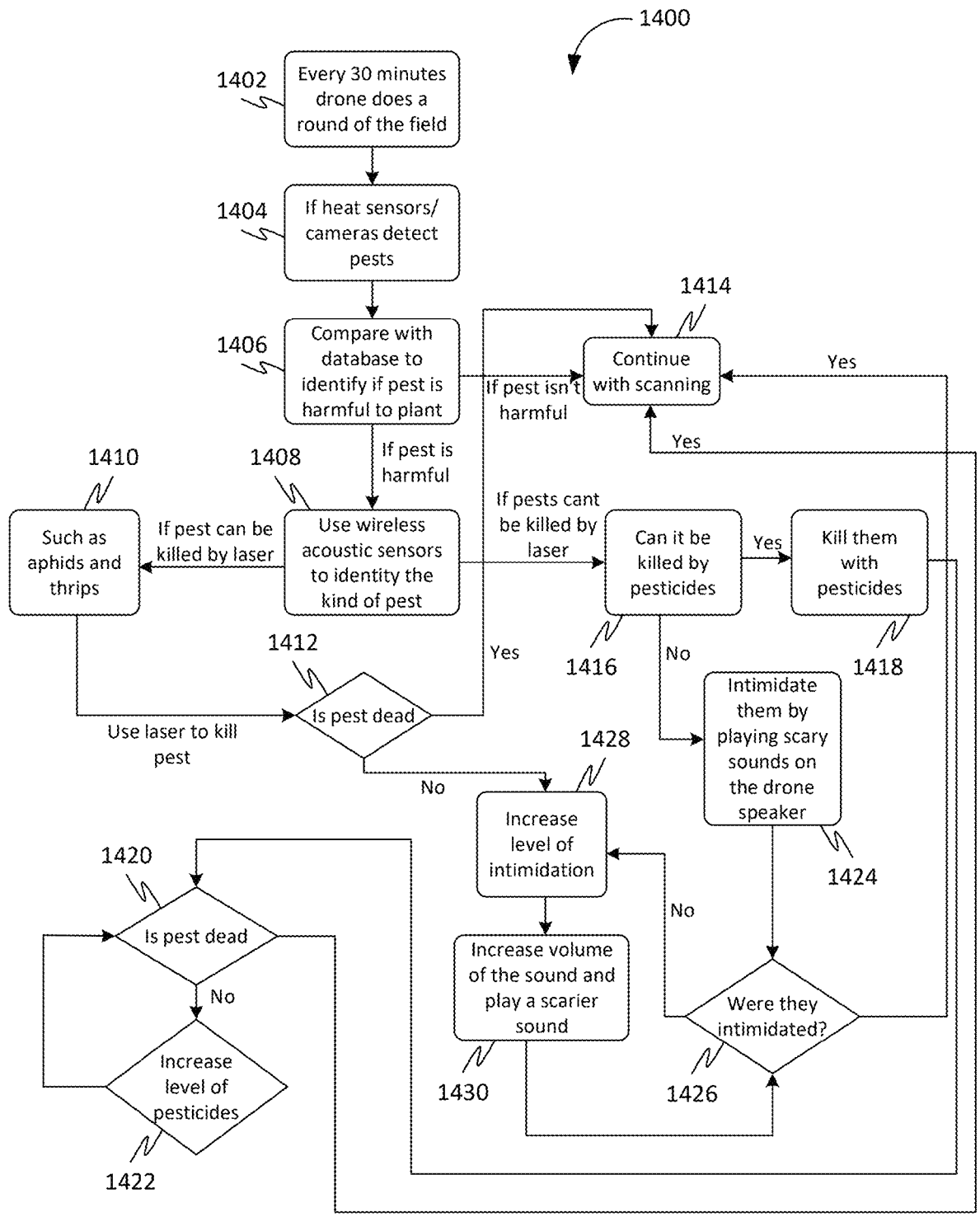
FIG. 14 is a flow diagram of a method 1400 for provisioning assistance to users in performing activities, in accordance with some embodiments.

FIG. 14 is a flow diagram of a method 1400 for provisioning assistance to users in performing activities, in accordance with some embodiments. Further, at step 1402 of the method 1400, a drone does a round of a field every 30 minutes. Further, at step 1404 of the method 1400, following step 1402, a detection of pests is performed using heat sensors and/or cameras of the drone. If the pests are detected then at step 1406 of the method 1400 following step 1404, the detected pests are compared with a database to identify whether the pests are harmful to the plants in the field. If the pests are harmful, then at step 1408 of the method 1400 following step 1406, wireless acoustic sensors are used to identify the kind of the pests. If the pests are identified as the pests that can be killed by laser in step 1408, then at step 1410 of the method 1400 following step 1408 the pests are identified as aphids and *thrips*, which are a kind of pests that can be killed by laser. After identifying the pests as aphids and *thrips* that can be killed by laser, the laser is used to kill the pests. Further, at step 1412 of the method 1400 following step 1410, whether the pests are dead is determined. If yes, then at step 1414 of the method 1400 following step 1412, the drone continues with scanning. If no, then at step 1428 of the method 1400 following step 1412, a level of intimidation is increased. If the pests are identified as the pests that cannot be killed by laser in step 1408, then at step 1416 of the method 1400 following step 1408, whether the pests can be killed by pesticides is determined. If yes, then at step 1418 of the method 1400 following step 1416, the pests are killed with pesticides. Further, at step 1420 of the method 1400 following step 1418, whether the pests are dead is determined. If yes, then step 1414 follows step 1420. If no, then at step 1422 of the method 1400 following step 1420, a level of pesticides is increased. Further, step 1420 is followed by step 1422. If the pests cannot be killed by pesticides, at step 1424 of the method 1400 following step 1416, scary sounds on a speaker of the drone are played to intimidate the pests. Further, at 1426 of the method 1400 following step 1424, whether the pests were intimidated. If no, step 1428 is followed by step 1428. Further, at step 1430 of the method 1400 following step 1428, a volume of the sound is increased to play a scarier sound. Further, step 1426 is followed by step 1430. If the pests are identified as not harmful, step 1414 follows step 1406.

Figure 15:
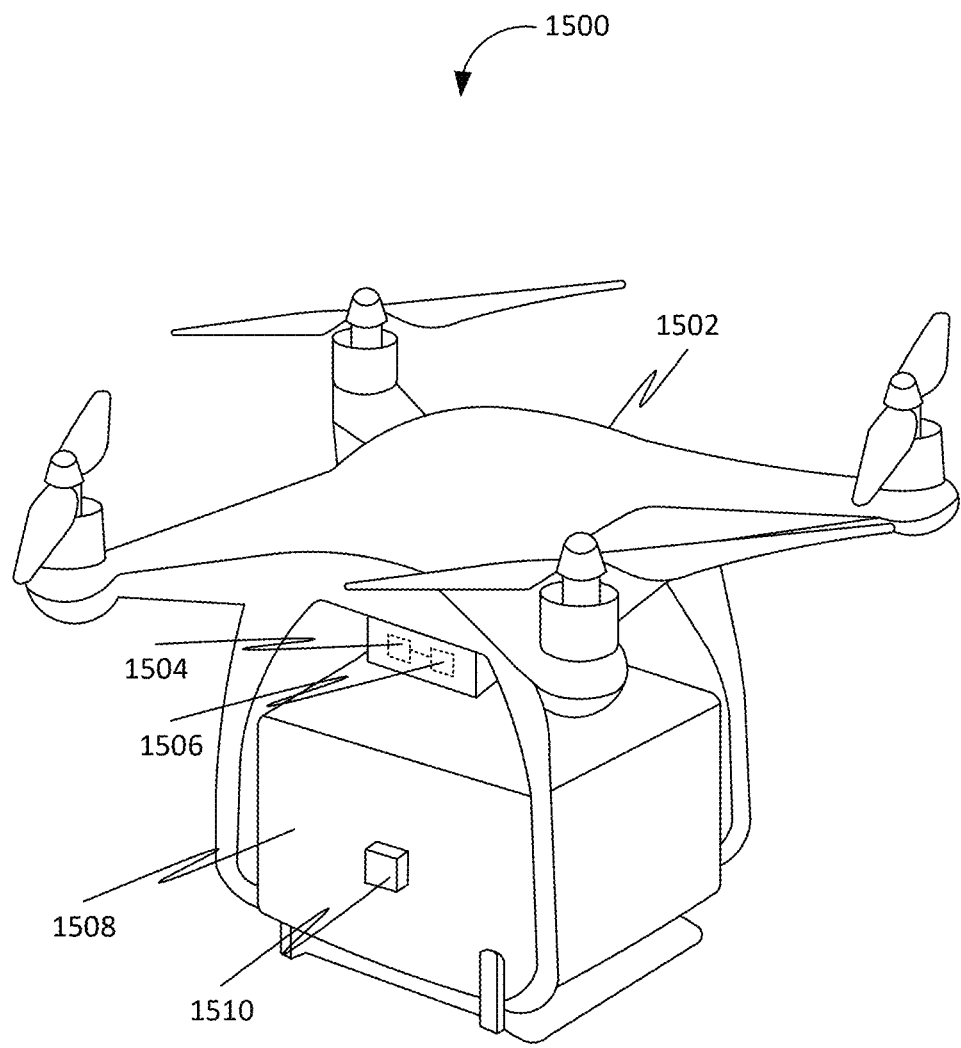
FIG. 15 is a top perspective view of an apparatus 1500 for provisioning assistance to users in performing activities, in accordance with some embodiments.

FIG. 15 is a top perspective view of an apparatus 1500 for provisioning assistance to users in performing activities, in accordance with some embodiments. Accordingly, the apparatus 1500 may include a drone 1502, at least one imaging sensor 1504, a processing device 1506, and at least one device 1508.

Further, the drone 1502 may be configured to be at least one of positioned and moved to at least one of a plurality of positions.

Further, the at least one imaging sensor 1504 may be coupled to the drone 1502. Further, the at least one imaging sensor 1504 may be configured for imaging an environment of the drone 1502 based on at least one of the positioning and the moving of the drone 1502 to at least one of the plurality of positions. Further, the imaging of the environment assists at least one user in performing at least one activity.

Further, the processing device 1506 may be coupled to the drone 1502. Further, the processing device 1506 may be communicatively coupled with the at least one imaging sensor 1504. Further, the processing device 1506 may be configured for generating at least one imaging data based on the imaging. Further, the processing device 1506 may be configured for analyzing the at least one imaging data using at least one machine learning model. Further, the processing device 1506 may be configured for generating at least one insight associated with the at least one activity based on the analyzing of the at least one imaging data. Further, the processing device 1506 may be configured for determining at least one operation based on the at least one insight.

Further, the at least one device 1508 may be coupled with the drone 1502. Further, the at least one device 1508 may be operatively coupled with the processing device 1506. Further, the at least one device 1508 may be configured for performing the at least one operation. Further, the at least one device 1508 may include at least one dispenser 1510. Further, the at least one dispenser 1510 may be configured for dispensing at least one amount of at least one fluid supplied to the at least one dispenser 1510. Further, the performing of the at least one operation may include the dispensing of the at least one amount of the at least one fluid.

Figure 16:
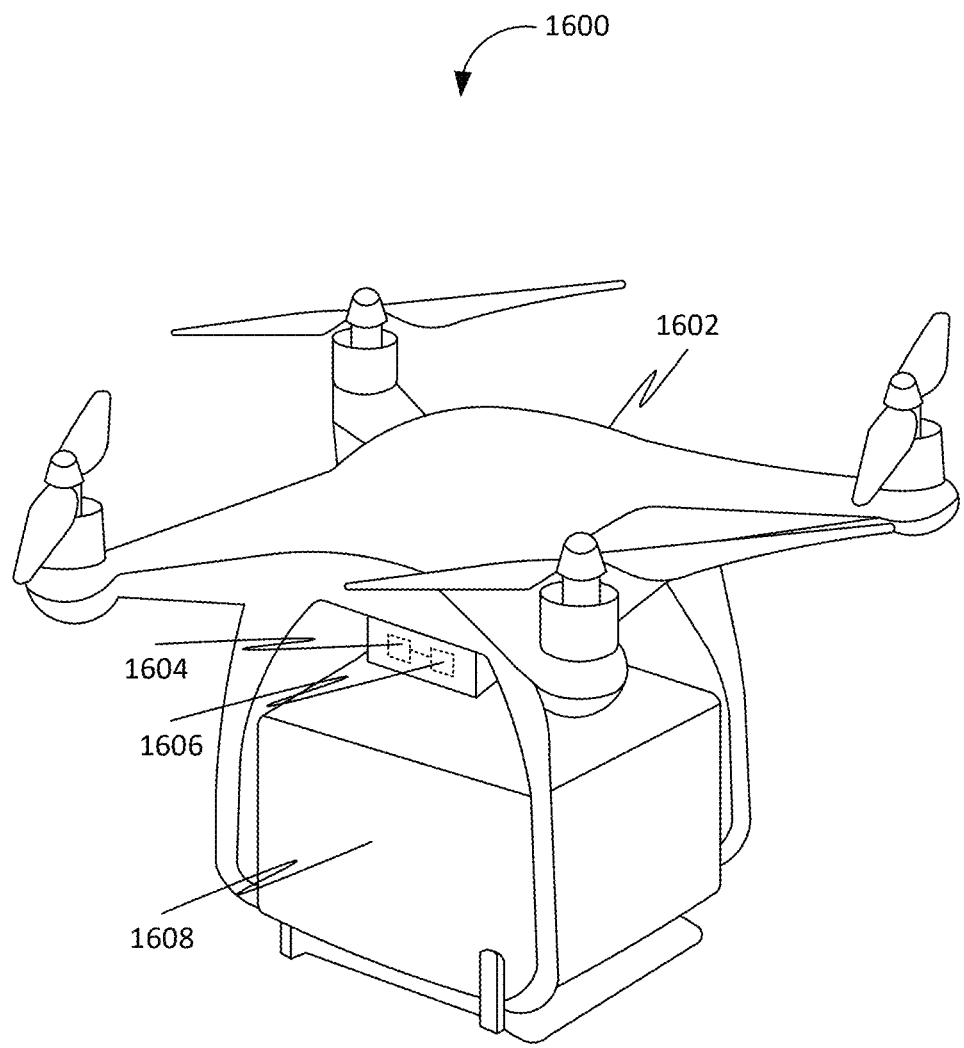
FIG. 16 is a top perspective view of an apparatus 1600 for provisioning assistance to users in performing activities, in accordance with some embodiments.

FIG. 16 is a top perspective view of an apparatus 1600 for provisioning assistance to users in performing activities, in accordance with some embodiments. Accordingly, the apparatus 1600 may include a drone 1602, at least one imaging sensor 1604, a processing device 1606, and at least one device 1608.

Further, the drone 1602 may be configured to be at least one of positioned and moved to at least one of a plurality of positions.

Further, the at least one imaging sensor 1604 may be coupled to the drone 1602. Further, the at least one imaging sensor 1604 may be configured for imaging an environment of the drone 1602 based on at least one of the positioning and the moving of the drone 1602 to at least one of the plurality of positions. Further, the imaging of the environment assists at least one user in performing at least one activity.

Further, the processing device 1606 may be coupled to the drone 1602. Further, the processing device 1606 may be communicatively coupled with the at least one imaging sensor 1604. Further, the processing device 1606 may be configured for generating at least one imaging data based on the imaging. Further, the processing device 1606 may be configured for analyzing the at least one imaging data using at least one machine learning model. Further, the processing device 1606 may be configured for recognizing at least one organism present in at least one region based on the analyzing of the at least one imaging data. Further, the processing device 1606 may be configured for generating at least one organism data of the at least one organism based on the recognizing of the at least one organism and the analyzing of the at least one imaging data. Further, the processing device 1606 may be configured for analyzing the at least one organism data based on at least one additional data. Further, the processing device 1606 may be configured for generating at least one insight associated with the at least one activity based on the analyzing of the at least one imaging data and the analyzing of the at least one organism data. Further, the processing device 1606 may be configured for determining at least one operation based on the at least one insight.

Further, the at least one device 1608 may be coupled with the drone 1602. Further, the at least one device 1608 may be operatively coupled with the processing device 1606. Further, the at least one device 1608 may be configured for performing the at least one operation.

Figure 17:
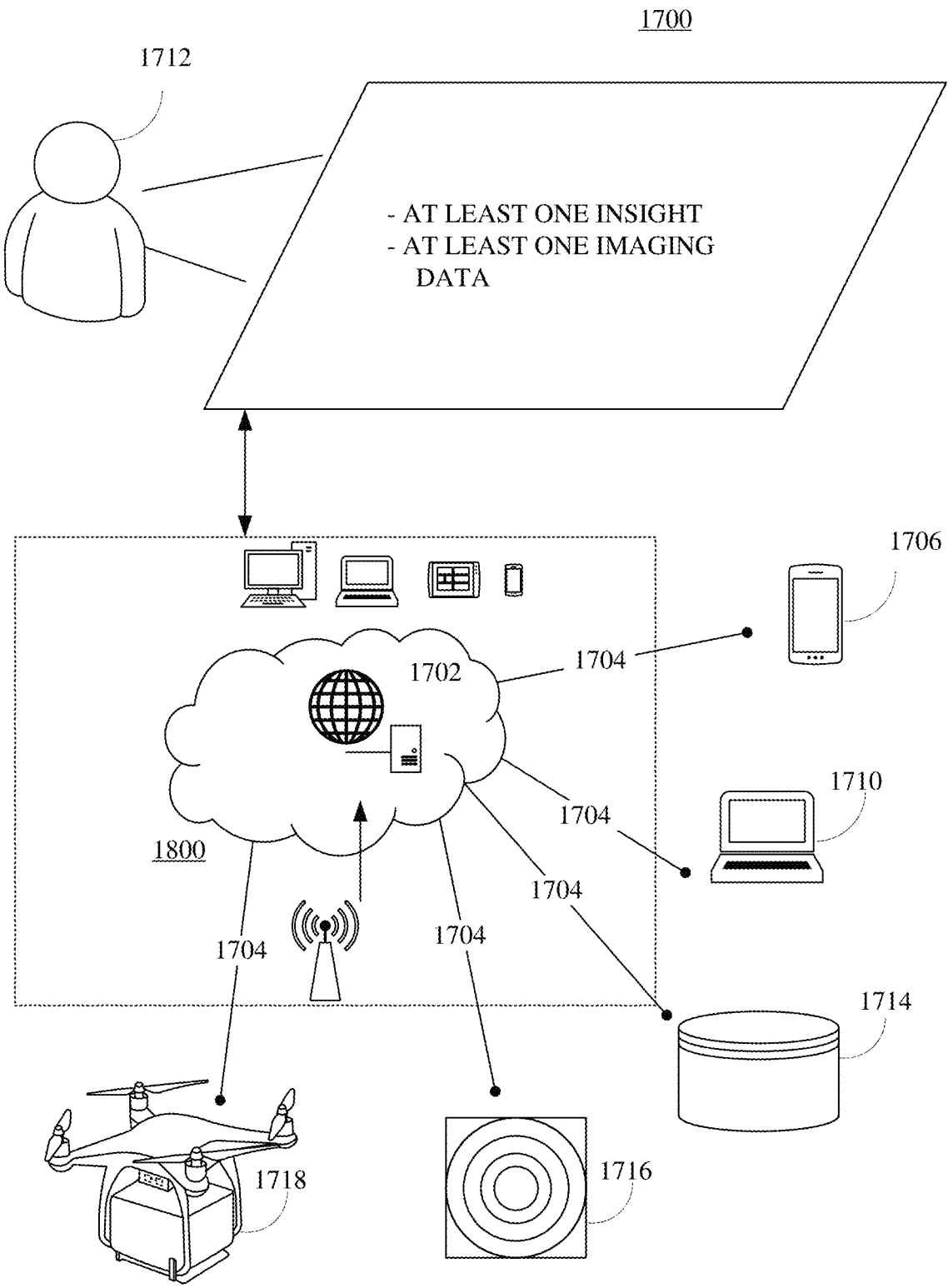
FIG. 17 is an illustration of an online platform 1700 consistent with various embodiments of the present disclosure

FIG. 17 is an illustration of an online platform 1700 consistent with various embodiments of the present disclosure. By way of non-limiting example, the online platform 1700 to facilitate provisioning assistance to users in performing activities may be hosted on a centralized server 1702, such as, for example, a cloud computing service. The centralized server 1702 may communicate with other network entities, such as, for example, a mobile device 1706 (such as a smartphone, a laptop, a tablet computer, etc.), other electronic devices 1710 (such as desktop computers, server computers, etc.), databases 1714, sensors 1716, and an apparatus 1718 (such as the apparatus 100, the apparatus 1500, the apparatus 1600, etc.) over a communication network 1704, such as, but not limited to, the Internet. Further, users of the online platform 1700 may include relevant parties such as, but not limited to, end-users, administrators, service providers, service consumers, and so on. Accordingly, in some instances, electronic devices operated by the one or more relevant parties may be in communication with the platform.

A user 1712, such as the one or more relevant parties, may access online platform 1700 through a web based software application or browser. The web based software application may be embodied as, for example, but not be limited to, a website, a web application, a desktop application, and a mobile application compatible with a computing device 1800.

Figure 18:
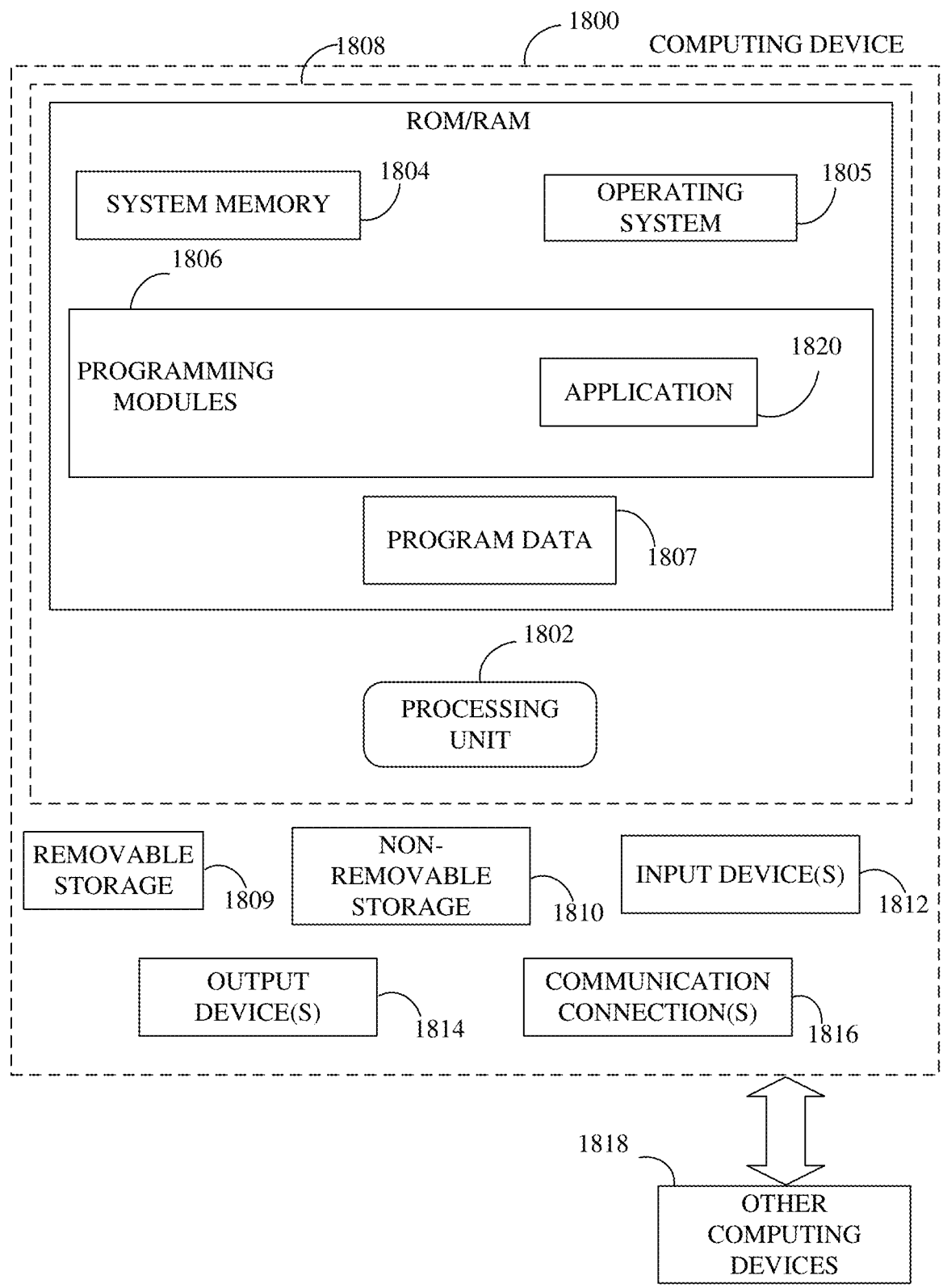
FIG. 18 is a block diagram of a computing device 1800 for implementing the methods disclosed herein, in accordance with some embodiments.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random-access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. In one embodiment, programming modules 1806 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and non-volatile, removable, and non-removable media implemented in any method or technology for storage of information, such as computer-readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, a location sensor, a camera, a biometric sensor, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 (e.g., application 1820 such as a media player) may perform processes including, for example, one or more stages of methods, algorithms, systems, applications, servers, databases as described above. The aforementioned process is an example, and processing unit 1802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for provisioning assistance to users in performing activities, the apparatus comprising:
   a drone configured to be at least one of positioned and moved to at least one of a plurality of positions;
   at least one imaging sensor coupled to the drone, wherein the at least one imaging sensor is configured for imaging an environment of the drone based on at least one of the positioning and the moving of the drone to at least one of the plurality of positions, wherein the imaging of the environment assists at least one user in performing at least one activity;
   a processing device coupled to the drone, wherein the processing device is communicatively coupled with the at least one imaging sensor, wherein the processing device is configured for:
   generating at least one imaging data based on the imaging;
   analyzing the at least one imaging data using at least one machine learning model;
   recognizing at least one organism present in at least one region based on the analyzing of the at least one imaging data;
   generating at least one organism data of the at least one organism based on the recognizing of the at least one organism and the analyzing of the at least one imaging data;
   analyzing the at least one organism data based on at least one additional data;
   generating at least one insight associated with the at least one activity based on the analyzing of the at least one imaging data, wherein the generating of the at least one insight is further based on the analyzing of the at least one organism data;
   determining at least one operation based on the at least one insight, wherein the determining of the at least one operation comprises selecting the at least one operation from a plurality of operations based on the at least one insight; and
   selecting at least one first device from a plurality of devices based on the selecting of the at least one operation; and
   at least one device coupled with the drone, wherein the at least one device is operatively coupled with the processing device, wherein the at least one device is configured for performing the at least one operation, wherein the at least one device comprises the plurality of devices, wherein the at least one first device is configured for performing the at least one operation based on the selecting of the at least one first device, wherein the performing of the at least one operation treats the at least one organism with at least one treatment, wherein the processing device is further configured for:
   generating at least one first imaging data after the performing of the at least one operation based on the imaging;
   analyzing the at least one first imaging data using the at least one machine learning model;
   generating at least one first insight after the performing of the at least one operation based on the analyzing of the at least one first imaging data and the recognizing of the at least one organism; and
   determining at least one first operation based on the at least one first insight, wherein the at least one first device is further configured for performing the at least one first operation, wherein the performing of the at least one first operation treats the at least one organism with the at least one first treatment, wherein a first intensity of the at least one first treatment is greater than an intensity of the at least one treatment.

2. The apparatus of claim 1 further comprising at least one geolocation sensor coupled to the drone, wherein the at least one geolocation sensor is communicatively coupled with the processing device, wherein the at least one geolocation sensor is configured for detecting a geolocation of the drone based on at least one of the positioning and the moving of the drone to at least one of the plurality of positions, wherein the processing device is configured for:

generating at least one geolocation data associated with the drone based on the detecting of the geolocation; and analyzing the at least one geolocation data, wherein the generating of the at least one insight is further based on the analyzing of the at least one geolocation data.

3. The apparatus of claim 1 further comprising at least one user sensor communicatively coupled with the processing device, wherein the at least one user sensor is configured for detecting at least one of a physical state, a physiological state, and an emotional state of the at least one user associated with the at least one activity, wherein the processing device is further configured for:

generating at least one user data of the at least one user based on the detecting of at least one of the physical state, the physiological state, and the emotional state of the at least one user; and analyzing the at least one user data, wherein the generating of the at least one insight is further based on the analyzing of the at least one user data.

4. The apparatus of claim 1 further comprising at least one motion sensor coupled to the drone, wherein the at least one motion sensor is communicatively coupled with the processing device, wherein the at least one motion sensor is configured for detecting at least one motion of at least one of at least one object associated with the at least one activity and the at least one user associated with the at least one activity, wherein the processing device is further configured for:

generating at least one motion data based on the detecting of the at least one motion of at least one of the at least one object and the at least one user; and analyzing the at least one motion data, wherein the generating of the at least one insight is further based on the analyzing of the at least one motion data.

5. The apparatus of claim 1, wherein the processing device is further configured for:

determining at least one of a plurality of subsequent positions for the drone after at least one of the positioning and the moving of the drone to at least one of the plurality of positions based on the analyzing of the at least one imaging data; and generating at least one command for the drone based on the determining of at least one of the plurality of subsequent positions, wherein the drone is operatively coupled with the processing device, wherein the drone is configured for at least one of positioning and moving to at least one of the plurality of subsequent positions after at least one of the positioning and the moving of the drone to at least one of the plurality of position based on the at least one command.

6. The apparatus of claim 1 further comprising a storage device coupled with the drone, wherein the storage device is communicatively coupled with the processing device, wherein the storage device is configured for retrieving at least one activity data associated with the at least one activity, wherein the processing device is further configured for:

analyzing the at least one activity data;

determining at least one of the plurality of positions for the drone based on the analyzing of the at least one activity data; and generating at least one first command for the drone based on the determining of at least one of the plurality of positions of the drone, wherein at least one of the positioning and the moving of the drone to at least one of the plurality of positions is based on the at least one first command.

7. The apparatus of claim 1 further comprising at least one environment sensor coupled to the drone, wherein the at least one environment sensor is communicatively coupled with the processing device, wherein the at least one environment sensor is configured for detecting at least one environmental condition of the environment, wherein the processing device is further configured for:

generating at least one environment data for the at least one environmental condition based on the detecting; and analyzing the at least one environment data using the at least one machine learning model, wherein the generating of the at least one insight is further based on the analyzing of the at least one environment data.

8. The apparatus of claim 1, wherein the at least one device comprises a communication device, wherein the communication device is communicatively coupled with the processing device, wherein the communication device is configured for transmitting at least one of the at least one imaging data and the at least one insight to at least one external device, wherein the performing of the at least one operation comprises the transmitting of at least one of the at least one imaging data and the at least one insight.

9. The apparatus of claim 1, wherein the at least one device comprises at least one dispenser, wherein the at least one dispenser is configured for dispensing at least one amount of at least one fluid supplied to the at least one dispenser, wherein the performing of the at least one operation comprises the dispensing of the at least one amount of the at least one fluid.

10. The apparatus of claim 1, wherein the at least one device comprises at least one presentation device, wherein the at least one presentation device is communicatively coupled with the processing device, wherein the at least one presentation device is configured for presenting at least one of the at least one insight and the at least one imaging data to the at least one user, wherein the performing of the at least one operation comprises the presenting of at least one of the at least one insight and the at least one imaging data.

11. The apparatus of claim 1, wherein the at least one device comprises at least one object delivering device, wherein the at least one object delivering device is configured for delivering at least one object carried by the drone using the at least one object delivering device to the at least one user, wherein the performing of the at least one operation comprises the delivering of the at least one object.

12. The apparatus of claim 1, wherein the at least one device comprises an additional communication device, wherein the additional communication device is configured for establishing a two way communication between the at least one device and at least one external device, wherein the establishing of the two way communication allows the at least one user at least one of send and receive at least one information through the at least one device, wherein the performing of the at least one operation comprises the establishing of the two way communication.

13. The apparatus of claim 1, wherein the processing device is further configured for:

generating at least one second imaging data after the performing of the at least one operation based on the imaging;

analyzing the at least one second imaging data using the at least one machine learning model;
generating at least one second insight after the performing of the at least one operation based on the analyzing of the at least one second imaging data and the recognizing of the at least one organism;
determining at least one second operation based on the at least one second insight; and
selecting at least one second device from the plurality of devices based on the determining of the at least one second operation, wherein the at least one second device is configured for performing the at least one second operation based on the selecting of the at least one second device, wherein the performing of the at least one second operation treats the at least one organism with at least one second treatment, wherein the at least one second treatment is distinct from the at least one treatment.

14. The apparatus of claim 1, wherein the processing device is further configured for:
determining at least one first position for the drone based on the at least one insight; and
generating at least one second command for the drone based on the determining of the at least one first position, wherein the drone is operatively coupled with the processing device, wherein the drone is configured for at least one of positioning and moving to the at least one first position based on the at least one second command.

15. The apparatus of claim 1, wherein the at least one device comprises at least one interaction device, wherein the at least one interaction device is communicatively coupled with the processing device, wherein the at least one interaction device is configured for conducting at least one interaction with the at least one user, wherein the performing of the at least one operation comprises the conducting of the at least one interaction with the at least one user.

16. An apparatus for provisioning assistance to users in performing activities, the apparatus comprising:
a drone configured to be at least one of positioned and moved to at least one of a plurality of positions;
at least one imaging sensor coupled to the drone, wherein the at least one imaging sensor is configured for imaging an environment of the drone based on at least one of the positioning and the moving of the drone to at least one of the plurality of positions, wherein the imaging of the environment assists at least one user in performing at least one activity;
a processing device coupled to the drone, wherein the processing device is communicatively coupled with the at least one imaging sensor, wherein the processing device is configured for:
generating at least one imaging data based on the imaging;
analyzing the at least one imaging data using at least one machine learning model;
recognizing at least one organism present in at least one region based on the analyzing of the at least one imaging data;
generating at least one organism data of the at least one organism based on the recognizing of the at least one organism and the analyzing of the at least one imaging data;
analyzing the at least one organism data based on at least one additional data;
generating at least one insight associated with the at least one activity based on the analyzing of the at least one imaging data, wherein the generating of the at least one insight is further based on the analyzing of the at least one organism data;
determining at least one operation based on the at least one insight, wherein the determining of the at least one operation comprises selecting the at least one operation from a plurality of operations based on the at least one insight; and
selecting at least one first device from a plurality of devices based on the selecting of the at least one operation; and
at least one device coupled with the drone, wherein the at least one device is operatively coupled with the processing device, wherein the at least one device is configured for performing the at least one operation, wherein the at least one device comprises at least one dispenser, wherein the at least one dispenser is configured for dispensing at least one amount of at least one fluid supplied to the at least one dispenser, wherein the performing of the at least one operation comprises the dispensing of the at least one amount of the at least one fluid, wherein the at least one device comprises the plurality of devices, wherein the at least one first device is configured for performing the at least one operation based on the selecting of the at least one first device, wherein the performing of the at least one operation treats the at least one organism with at least one treatment, wherein the processing device is further configured for:
generating at least one first imaging data after the performing of the at least one operation based on the imaging;
analyzing the at least one first imaging data using the at least one machine learning model;
generating at least one first insight after the performing of the at least one operation based on the analyzing of the at least one first imaging data and the recognizing of the at least one organism; and
determining at least one first operation based on the at least one first insight, wherein the at least one first device is further configured for performing the at least one first operation, wherein the performing of the at least one first operation treats the at least one organism with the at least one first treatment, wherein a first intensity of the at least one first treatment is greater than an intensity of the at least one treatment.

17. An apparatus for provisioning assistance to users in performing activities, the apparatus comprising:
a drone configured to be at least one of positioned and moved to at least one of a plurality of positions;
at least one imaging sensor coupled to the drone, wherein the at least one imaging sensor is configured for imaging an environment of the drone based on at least one of the positioning and the moving of the drone to at least one of the plurality of positions, wherein the imaging of the environment assists at least one user in performing at least one activity;
a processing device coupled to the drone, wherein the processing device is communicatively coupled with the at least one imaging sensor, wherein the processing device is configured for:
generating at least one imaging data based on the imaging;
analyzing the at least one imaging data using at least one machine learning model;

recognizing at least one organism present in at least one region based on the analyzing of the at least one imaging data;

generating at least one organism data of the at least one organism based on the recognizing of the at least one organism and the analyzing of the at least one imaging data;

analyzing the at least one organism data based on at least one additional data;

generating at least one insight associated with the at least one activity based on the analyzing of the at least one imaging data and the analyzing of the at least one organism data;

determining at least one operation based on the at least one insight, wherein the determining of the at least one operation comprises selecting the at least one operation from a plurality of operations based on the at least one insight; and selecting at least one first device from a plurality of devices based on the selecting of the at least one operation; and at least one device coupled with the drone, wherein the at least one device is operatively coupled with the processing device, wherein the at least one device is configured for performing the at least one operation, wherein the at least one device comprises the plurality of devices, wherein the at least one first device is configured for performing the at least one operation based on the selecting of the at least one first device, wherein the performing of the at least one operation treats the at least one organism with at least one treatment, wherein the processing device is further configured for:

generating at least one second imaging data after the performing of the at least one operation based on the imaging;

analyzing the at least one second imaging data using the at least one machine learning model;

generating at least one second insight after the performing of the at least one operation based on the analyzing of the at least one second imaging data and the recognizing of the at least one organism;

determining at least one second operation based on the at least one second insight; and selecting at least one second device from the plurality of devices based on the determining of the at least one second operation, wherein the at least one second device is configured for performing the at least one second operation based on the selecting of the at least one second device, wherein the performing of the at least one second operation treats the at least one organism with at least one second treatment, wherein the at least one second treatment is distinct from the at least one treatment.

* * * * *